(12) United States Patent
Lawson et al.

(10) Patent No.: US 9,568,908 B2
(45) Date of Patent: Feb. 14, 2017

(54) INDUSTRIAL AUTOMATION APP-STORE

(71) Applicant: Rockwell Automation Technologies, Inc., Mayfield Heights, OH (US)

(72) Inventors: Douglas C. Lawson, Silverado, CA (US); Douglas J. Reichard, Fairview Park, OH (US); Joseph A. Harkulich, Willoughby, OH (US); Rainer Hessmer, Rancho Santa Margarita, CA (US); Sujeet Chand, Brookfield, WI (US); David W. Farchmin, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 551 days.

(21) Appl. No.: 13/677,060

(22) Filed: Nov. 14, 2012

(65) Prior Publication Data
US 2013/0212160 A1     Aug. 15, 2013

Related U.S. Application Data

(60) Provisional application No. 61/587,531, filed on Feb. 9, 2012.

(51) Int. Cl.
*G06F 15/16*     (2006.01)
*G05B 19/418*     (2006.01)
(Continued)

(52) U.S. Cl.
CPC ........... *G05B 19/4185* (2013.01); *G05B 11/01* (2013.01); *G06F 1/12* (2013.01); *G06F 1/14* (2013.01);
(Continued)

(58) Field of Classification Search
CPC .... G06F 9/5072; G06F 1/14; G06F 17/30545; G06F 1/12; G06F 17/30554; G06F 17/30867; G06F 17/30233; G05B 11/01; G05B 2219/31326; G05B 19/4185; G05B 2219/31334; G05B 15/02; G05B 19/41865; G05B 2219/33151; G05B 19/056; G05B 19/05; G05B 19/052; G05B 2219/13004; H04L 67/10; H04L 41/069; H04L 67/16; H04L 67/42
See application file for complete search history.

(56) References Cited

U.S. PATENT DOCUMENTS 5,014,317 A     5/1991 Kita et al.
5,122,948 A     6/1992 Zapolin
(Continued)

FOREIGN PATENT DOCUMENTS

CN     101114160     1/2008
CN     101536002     9/2009
(Continued)

OTHER PUBLICATIONS

Office Action dated Dec. 27, 2004 for U.S. Appl. No. 10/162,315, 8 pages.
(Continued)

*Primary Examiner* — Dustin Nguyen
*Assistant Examiner* — Juan C Turriate Gastulo
(74) *Attorney, Agent, or Firm* — Amin, Turocy & Watson, LLP

(57) ABSTRACT

A cloud-based industrial application provisioning system is provided. The industrial application provisioning system can reside on a cloud platform and be made available to developers and end users with access privileges to the cloud platform. Application developers can publish industrial applications to an application library on the cloud platform, where the application is cataloged within an industry-specific search hierarchy. A search engine allows a user to
(Continued)

access the cloud platform and search for a desired industrial application. The library's hierarchical catalog allows the user to search for applications according to industry type, equipment in use, automation system type, or other suitable criteria.

21 Claims, 17 Drawing Sheets

(51) Int. Cl.
G05B 11/01 (2006.01)
G06F 17/30 (2006.01)
H04L 29/06 (2006.01)
H04L 29/08 (2006.01)
G06F 1/12 (2006.01)
G06F 1/14 (2006.01)
G06F 9/50 (2006.01)

(52) U.S. Cl.
CPC ....... G06F 9/5072 (2013.01); G06F 17/30233 (2013.01); G06F 17/30545 (2013.01); G06F 17/30554 (2013.01); G06F 17/30867 (2013.01); H04L 67/10 (2013.01); H04L 67/16 (2013.01); H04L 67/42 (2013.01); G05B 2219/31326 (2013.01); G05B 2219/31334 (2013.01); G05B 2219/33139 (2013.01); Y02P 80/114 (2015.11); Y02P 90/16 (2015.11); Y02P 90/18 (2015.11); Y02P 90/185 (2015.11)

(56) References Cited

U.S. PATENT DOCUMENTS

| | | |
|---|---|---|
| 5,199,009 A | 3/1993 | Svast |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,978,568 A | 11/1999 | Abraham et al. |
| 6,167,337 A | 12/2000 | Haack |
| 6,175,770 B1 | 1/2001 | Bladow |
| 6,175,801 B1 | 1/2001 | Millington |
| 6,199,068 B1 | 3/2001 | Carpenter |
| 6,279,113 B1 | 8/2001 | Vaidya |
| 6,282,455 B1 | 8/2001 | Engdahl |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,535,926 B1 | 3/2003 | Esker |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,708,074 B1 | 3/2004 | Chi et al. |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,774,598 B1 | 8/2004 | Kohler |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,298,275 B2 | 11/2007 | Brandt et al. |
| 7,310,344 B1 | 12/2007 | Sue |
| 7,383,155 B2 | 6/2008 | Rosam et al. |
| 7,412,548 B2 | 8/2008 | Sichner |
| 7,478,010 B2 | 1/2009 | Hashemian |
| 7,480,728 B2 | 1/2009 | Evans |
| 7,539,724 B1 | 5/2009 | Callaghan |
| 7,734,590 B2 | 6/2010 | Chand et al. |
| 8,150,959 B1 | 4/2012 | Bezdicek et al. |
| 8,266,066 B1 | 9/2012 | Wezter et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,686,871 B2 | 4/2014 | Jensen et al. |
| 9,024,955 B2 | 5/2015 | Ramarao et al. |
| 9,438,648 B2 | 9/2016 | Asenjo et al. |
| 2002/0004798 A1 | 1/2002 | Babula et al. |
| 2002/0016839 A1 | 2/2002 | Smith |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0073236 A1 | 6/2002 | Helgeson et al. |
| 2002/0077711 A1 | 6/2002 | Nixon et al. |
| 2002/0094588 A1 | 7/2002 | Fan et al. |
| 2002/0107904 A1 | 8/2002 | Talluri et al. |
| 2002/0156872 A1 | 10/2002 | Brown |
| 2002/0156926 A1 | 10/2002 | Batka |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0051074 A1 | 3/2003 | Edwards |
| 2003/0056224 A1 | 3/2003 | Stone |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves |
| 2004/0214566 A1 | 10/2004 | Suzuki et al. |
| 2004/0215551 A1 | 10/2004 | Eder |

(56) References Cited

U.S. PATENT DOCUMENTS

| | | |
|---|---|---|
| 2004/0225629 A1 | 11/2004 | Eder |
| 2004/0267729 A1 | 12/2004 | Swaminathan et al. |
| 2005/0038528 A1 | 2/2005 | McKelvey et al. |
| 2005/0055429 A1 | 3/2005 | Abele |
| 2005/0080799 A1 | 4/2005 | Hamden et al. |
| 2005/0120112 A1 | 6/2005 | Wing et al. |
| 2005/0125441 A1 | 6/2005 | Clemens et al. |
| 2005/0149922 A1* | 7/2005 | Vincent .................. 717/172 |
| 2005/0209902 A1 | 9/2005 | Iwasaki et al. |
| 2006/0022048 A1 | 2/2006 | Johnson |
| 2006/0046712 A1 | 3/2006 | Shamp et al. |
| 2006/0077095 A1 | 4/2006 | Tucker et al. |
| 2006/0149813 A1 | 7/2006 | Janik |
| 2006/0153089 A1 | 7/2006 | Silverman |
| 2006/0173873 A1 | 8/2006 | Prompt et al. |
| 2006/0253205 A1* | 11/2006 | Gardiner ........... G06F 17/28 700/19 |
| 2007/0008129 A1 | 1/2007 | Soliman |
| 2007/0019641 A1 | 1/2007 | Pai et al. |
| 2007/0050206 A1 | 3/2007 | Whikehart et al. |
| 2007/0061018 A1 | 3/2007 | Callaghan et al. |
| 2007/0073850 A1 | 3/2007 | Callaghan et al. |
| 2007/0118560 A1 | 5/2007 | Bornhoevd et al. |
| 2007/0192213 A1 | 8/2007 | Wu et al. |
| 2007/0194097 A1 | 8/2007 | Jones |
| 2007/0247789 A1 | 10/2007 | Benson et al. |
| 2008/0027704 A1 | 1/2008 | Kephart |
| 2008/0125887 A1 | 5/2008 | Case |
| 2008/0155064 A1 | 6/2008 | Kosuge |
| 2008/0189637 A1 | 8/2008 | Krajewski et al. |
| 2008/0208365 A1 | 8/2008 | Grgic et al. |
| 2008/0263514 A1 | 10/2008 | DeMesa |
| 2009/0063258 A1 | 3/2009 | Mueller et al. |
| 2009/0086692 A1 | 4/2009 | Chen |
| 2009/0088875 A1 | 4/2009 | Baier et al. |
| 2009/0089233 A1 | 4/2009 | Gach et al. |
| 2009/0089359 A1 | 4/2009 | Siorek et al. |
| 2009/0089682 A1 | 4/2009 | Baier |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2010/0076575 A1 | 3/2010 | Vasko et al. |
| 2010/0082129 A1 | 4/2010 | McGreevy et al. |
| 2010/0082453 A1* | 4/2010 | Speers et al. .................. 705/27 |
| 2010/0083232 A1* | 4/2010 | Chouinard ........... G06F 21/10 717/124 |
| 2010/0118895 A1 | 5/2010 | Radulescu |
| 2010/0153487 A1 | 6/2010 | Greven et al. |
| 2010/0192144 A1 | 7/2010 | Schmit |
| 2010/0241260 A1 | 9/2010 | Kilibarda et al. |
| 2010/0256795 A1 | 10/2010 | McLaughlin et al. |
| 2010/0257227 A1 | 10/2010 | McLaughlin |
| 2010/0257228 A1 | 10/2010 | Staggs et al. |
| 2010/0332008 A1 | 12/2010 | Knipfer et al. |
| 2011/0016058 A1 | 1/2011 | Pinchuk |
| 2011/0047230 A1 | 2/2011 | McGee |
| 2011/0276498 A1 | 11/2011 | Madhik |
| 2012/0054246 A1 | 3/2012 | Fischer |
| 2012/0072597 A1 | 3/2012 | Teather et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0147894 A1 | 6/2012 | Mulligan et al. |
| 2012/0232876 A1 | 9/2012 | Misra |
| 2012/0262069 A1 | 10/2012 | Reed |
| 2012/0290104 A1 | 11/2012 | Holt et al. |
| 2012/0304007 A1 | 11/2012 | Hanks et al. |
| 2012/0306620 A1 | 12/2012 | Karaffa et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111034 A1* | 5/2013 | Upadhya .................. 709/226 |
| 2013/0117064 A1 | 5/2013 | Sadeghi et al. |
| 2013/0117806 A1* | 5/2013 | Parthasarathy et al. ......... 726/1 |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0182107 A1 | 7/2013 | Anderson |
| 2013/0191106 A1 | 7/2013 | Kephart et al. |
| 2013/0204982 A1* | 8/2013 | Kim et al. .................. 709/219 |
| 2013/0211547 A1 | 8/2013 | Buchdunger et al. |
| 2013/0212420 A1 | 8/2013 | Lawson et al. |
| 2013/0257627 A1 | 10/2013 | Rafael |
| 2013/0283265 A1 | 10/2013 | Acharya et al. |
| 2013/0304237 A1 | 11/2013 | Schroeder et al. |
| 2013/0325545 A1 | 12/2013 | Mordvinova et al. |
| 2014/0046977 A1 | 2/2014 | Gopalakrishnan et al. |
| 2014/0047107 A1 | 2/2014 | Maturana et al. |
| 2014/0095654 A1 | 4/2014 | Finnerty et al. |
| 2014/0137257 A1 | 5/2014 | Martinez et al. |
| 2014/0156032 A1 | 6/2014 | Jenkins et al. |
| 2014/0156584 A1 | 6/2014 | Motukuri |
| 2014/0279641 A1 | 9/2014 | Singh et al. |
| 2014/0279948 A1 | 9/2014 | Mahate et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336795 A1 | 11/2014 | Asenjo et al. |
| 2014/0337000 A1 | 11/2014 | Asenjo et al. |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0304193 A1 | 10/2015 | Ishii et al. |
| 2015/0378356 A1 | 12/2015 | Hefeeda et al. |

FOREIGN PATENT DOCUMENTS

| | | |
|---|---|---|
| CN | 101739007 | 6/2010 |
| CN | 102449567 A | 5/2012 |
| CN | 102927937 | 2/2013 |
| DE | 19834456 | 2/2000 |
| EP | 1209558 A2 | 5/1996 |
| EP | 1531373 A2 | 5/2005 |
| EP | 1686442 A1 | 8/2006 |
| EP | 1933214 | 6/2008 |
| EP | 2189900 A1 | 5/2010 |
| EP | 2293164 A1 | 3/2011 |
| EP | 2453326 | 5/2012 |
| EP | 2469466 A1 | 6/2012 |
| EP | 2801938 | 11/2014 |
| EP | 2801940 | 11/2014 |
| EP | 2801941 | 11/2014 |
| WO | 0111586 A | 2/2001 |
| WO | 0169329 A2 | 9/2001 |
| WO | 0217131 | 2/2002 |
| WO | 03058506 A1 | 7/2003 |
| WO | 2008133715 | 11/2008 |
| WO | 2009046095 | 4/2009 |
| WO | 2011050482 | 5/2011 |
| WO | 2013007866 A1 | 1/2013 |

OTHER PUBLICATIONS

Office Action dated Jun. 15, 2005 for U.S. Appl. No. 10/162,315, 9 pages.

Office Action dated Sep. 9, 2005 for U.S. Appl. No. 10/162,315, 10 pages.

Vasudevan, A Web Services Primer, Apr. 4 2001, XML.com, http://webservices.xml.com/pub/a/ws/2001/04/04/webservices/index.html.

Office Action dated Mar. 6, 2006 for U.S. Appl. No. 10/162,315, 8 pages.

(56) References Cited

OTHER PUBLICATIONS

W3C, Web Services Description Language, http://www.w3.org/TR/wsd1.
European Search Report dated Mar. 18, 2004 for European Patent Application Serial No. 03026339, 3 Pages.
Compuquest, Inc., SPM-IM-Instant Messaging Client for SpreadMsg Wireless Messaging Software, http://www.compuquestinc.com/spmim.html.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html.
International Business Machines Corporation, Cross platform instant messaging using web services, Research Disclosure, Kenneth Mason Publications, Hampshire, GB, vol. 458, No. 156, Jun. 2002.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action dated Jun. 18, 2014 for U.S. Appl. No. 13/725,578, 13 pages.
Office Action dated Aug. 19, 2014 for U.S. Appl. No. 13/615195, 22 pages.
European Search Report dated Aug. 11, 2014 for European Application No. 14167714.6-1955, 7 pages.
European Search Report dated Aug. 11, 2014 for European Application No. 14167714.6-1955, 5 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
W3C, Web Services Description Language, http://www.w3.org/TR/wsd1, Mar. 15, 2001, 36 pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
Office Action dated Oct. 9, 2014 for U.S. Appl. No. 13/725,543, 10 pgs.
Office Action dated Dec. 12, 2014 for U.S. Appl. No. 13/725,578, 24 pages.
European Search Report dated Aug. 11, 2014 for European Application No. 14167706.2-1955, 7 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/725,619 dated Jul. 17, 2015, 45 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 141676262-1955, 8 pages.
Office Action dated Sep. 22, 2015 for European Application No. 14167707.0-1955, 9 pages.
Office Action for U.S. Appl. No. 13/725,660 dated Aug. 18, 2015, 90 pgs.
Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Colombo, Amando Walter, et al., "Towards the Factory of the Future: A Service-Oriented Cross-layer Infrastructure," ICT Shaping the World: A Scientific View, 2009, pp. 65-81.
Office Action for U.S. Appl. No. 13/615,195, dated Sep. 21, 2015, 19 pages.
Office Action for U.S. Appl. No. 13/725,660, dated Oct. 26, 2015, 79 pages.
Notice of Allowance for U.S. Appl. No. 13/725,619 dated Mar. 31, 2016, 26 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
"Recursion Software, ""SCADA-Aware Mobile"", Frisco, TX, Aug. 29,2012 (accessed from<<http://www.emsenergyautomation.com/brochures/scada.pdf>> on Feb. 11, 2016)".
"Ars Technica, ""Windows 7 themes: how to unlock them or create your own"", Nov. 12, 2009 (accessed from<<http://arstechnica.com/information-technology/2009/11/unlock-hidden-windows-7-themeslon Mar. 8, 2016>>)".
Non-Final Office Action for U.S. Appl. No. 14/088,014 dated Mar. 22, 2016, 98 pages.
"Microsoft," "Sharing Outlook 2010 Contac\Notes/Field?", microsoft.com, Jun. 23, 2011 (accessed on Mar. 11, 2016 from http://answers.microsoft.com/en-us/oftice/forum/office_2010-outlook/sharing-outlook-2010-contactnotes-field/c7e74273-ff60-4da3-a3aa-ccb6cadcd25e?auth= 1).
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Final Office Action for U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Chinese Office Action for Chinese Application Serial No. 201410195780.X, dated May 26, 2016, 16 pages (including translation).
Extended European Search Report for European Patent Application Serial No. 16160604.1, dated Aug. 17, 2016, 9 pages.
Non-Final Office Action for U.S. Appl. No. 14/088,011 dated May 12, 2016, 96 pages.
Office Action dated Jun. 21, 2016 for U.S. Appl. No. 13/615,195, 27 pages.

(56) References Cited

OTHER PUBLICATIONS

Final Office Action dated Jun. 17, 2016 for U.S. Appl. No. 13/725,543, 19 pages.
Office Action dated Jun. 17, 2016 for U.S. Appl. No. 14/087,970, 36 pages.
Chinese Office Action for Chinese Application No. 201410196775.0 dated May 5, 2016, 14 pages.
Chinese Office Action for Chinese Application No. 201410196127.5 dated Apr. 7, 2016, 13 pages.
Chinese Office Action for Chinese Application No. 201410196198.5 dated Mar. 29, 2016, 18 pages.
Chinese Office Action for Chinese Application No. 201410196775.0 dated Apr. 5, 2016, 14 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016 11 pages.
Chinese Office Action for Chinese Application No. 201410196114.8 dated Apr. 25, 2016, 20 pages.
Chinese Office Action for Chinese Application No. 201410196525.7, dated May 5, 2016, 13 pages.
Extended European Search Report for EP Patent Application Serial No. 13166670.3, dated Jun. 14, 2016, 10 pages.
"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index.html, 2 pages.
Final Office Action for U.S. Appl. No. 14/087,730, dated Aug. 24, 2016, 113 pages.
Non-Final Office Action for U.S. Appl. No. 14/087,835, dated Sep. 23, 2016, 82 pages.
Final Office Action for U.S. Appl. No. 14/087,821, dated Sep. 9, 2016, 97 pages.
Extended European Search Report for EP Patent Application Serial No. 16160611.6, dated Aug. 24, 2016, 10 pages.
Extended European Search Report for EP Patent Application Serial No. 16160602.5, dated Sep. 2, 2016, 9 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160610.8, dated Oct. 17, 2016, 2 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.

* cited by examiner

INDUSTRIAL AUTOMATION APP-STORE

RELATED APPLICATIONS

This application claims the benefit of U.S. Provisional Patent Application Ser. No. 61/587,531, filed on Feb. 9, 2012, and entitled "INDUSTRIAL AUTOMATION CLOUD COMPUTING SYSTEMS AND METHODS." This application is also related to U.S. patent application Ser. No. 10/162,315, filed on Jun. 4, 2002 (which issued as U.S. Pat. No. 7,151,966 on Dec. 19, 2006), and entitled "SYSTEM AND METHODOLOGY PROVIDING OPEN INTERFACE AND DISTRIBUTED PROCESSING IN AN INDUSTRIAL CONTROLLER ENVIRONMENT." The entireties of these applications are incorporated herein by reference.

TECHNICAL FIELD

The subject application relates generally to industrial automation, and, more particularly, to provision of industrial automation applications using a cloud-based provisioning system.

BACKGROUND

Early industrial automation systems were purely hardware-based, comprising complicated networks of relays, switches, timers, logic gates, and other such elements. With the advent of the programmable logic controller (PLC), many of these cumbersome hardware elements were replaced by equivalent software solutions, significantly reducing the size and complexity of automation systems. Over time, more aspects of the industrial automation process have come to rely on software-based solutions, including visualization (e.g., human-machine interfaces), control loop tuning, motor drive configuration, lot tracking, historical data collection, production reporting, etc. Moreover, recently developed software products have made it possible to integrate plant floor operations with higher level business considerations, allowing both levels to more easily coordinate their activities to achieve desired goals of the business enterprise as a whole. Such software products include enterprise resource planning (ERP) software, manufacturing execution system (MES) software, and other such applications.

As new industrial software products are introduced into the market place, there is an increasing reliance on such industrial software applications for the day-to-day operation of modern industrial automation systems and associated business planning.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to cloud-based provisioning of industrial automation applications. To this end, an industrial application provisioning system can be made available to developers and end users on a cloud platform. Industrial application developers can submit pre-tested industrial applications to an application library associated with the cloud-based application provisioning system. A client interface for the provisioning system can allow the developer to associate metadata with the application that can be used by the provisioning system to categorize the application in the library for simplified searching and browsing. In some embodiments, this metadata can specify a particular industry, control system type, device, equipment type, or vendor to which the submitted application relates.

The cloud-based provisioning system can include a search engine that allows an end user or another developer having access to the cloud platform to quickly and easily search for a desired industrial automation application as well as related components, modules, and/or extension packs for such applications. By virtue of the category metadata associated with the respective applications and their associated components, the user can search the cloud-based library for relevant industrial automation applications based on such criteria as the industry type, equipment in use, automation application (e.g., motor control, batch processing, welding, etc.), or other such criteria. Authorized users can also apply a ranking to selected applications in the library indicating a perceived quality of the selected applications for the consideration of other potential users of the applications.

In another aspect, the industrial application provisioning system can search for or filter applications in the cloud-based library based on contextual data obtained from the client. For example, a local search client associated with the provisioning system can determine one or more data structures, devices, or equipment in use at a customer's facility, and leverage this data to select a subset of industrial applications determined to be of potential relevance to the customer's automation system.

In one or more embodiments, the cloud-based provisioning system can download selected applications to an end user's local cloud-capable device. Alternatively, the cloud-based provisioning system can allow users to execute selected applications on virtual machines residing on the cloud platform using the cloud's storage and processing resources, thereby preserving the customer's local resources. These cloud resources can be allocated to an industrial enterprise for this purpose as a client-specific cloud resource allocation.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
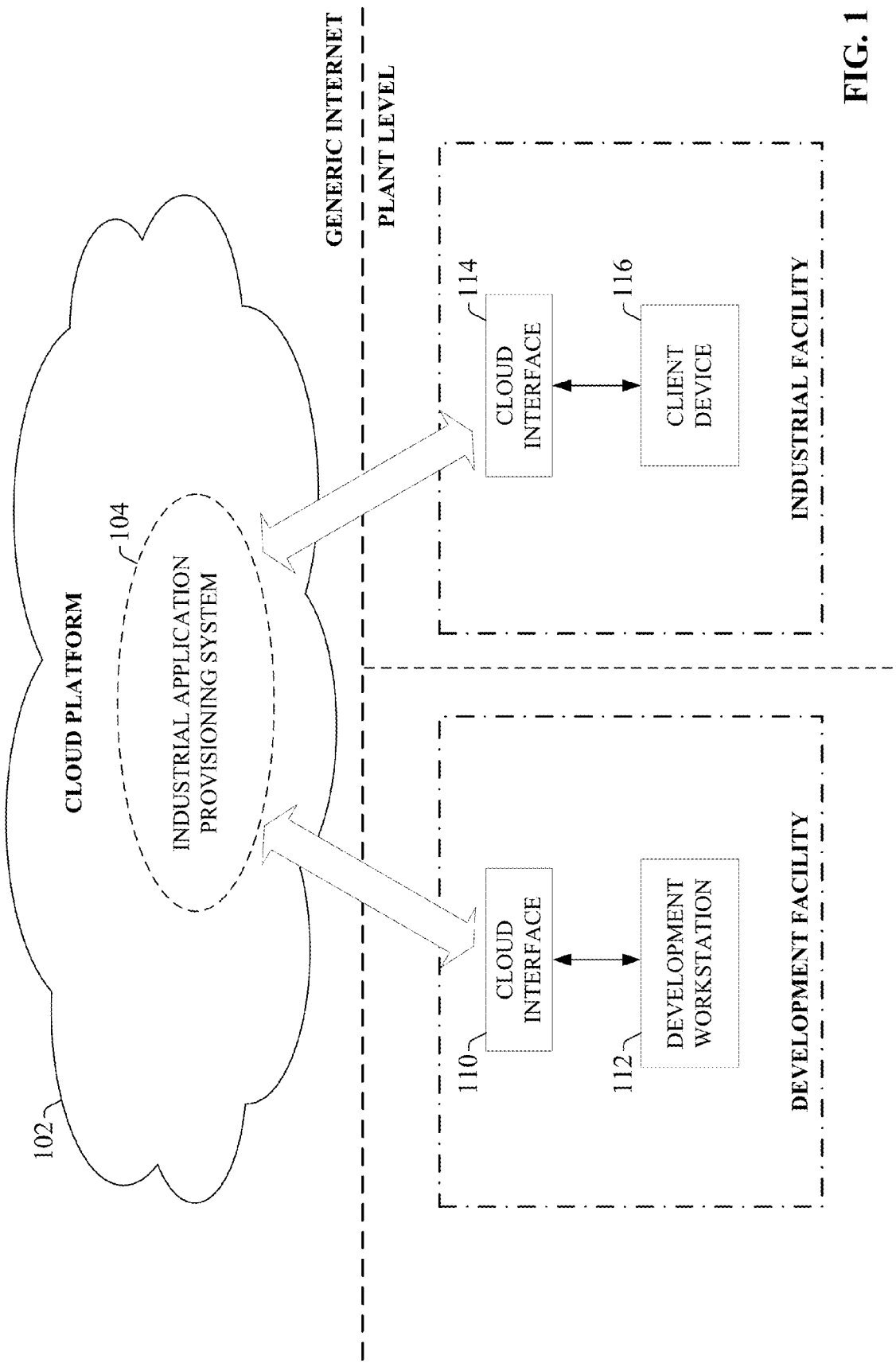
FIG. 1 is a high-level overview of a cloud-based industrial application provisioning system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of a cloud-based industrial application provisioning system. The industrial application provisioning system 104 can operate as a cloud service on a cloud platform 102. Cloud platform 102 can be any infrastructure that allows shared computing services 112, such as those provided by the industrial application provisioning system 104, to be accessed and utilized by cloud-capable devices. Cloud platform 102 can be a public cloud accessible via the Internet by devices having Internet connectivity and appropriate authorizations to utilize the industrial application provisioning system 104. In some scenarios, cloud platform 102 can be provided by a cloud provider as a platform-as-a-service (PaaS), and the industrial application provisioning system 104 can reside and execute on the cloud platform 102 as a cloud-based service. In some such configurations, access to the cloud platform 102 and the provisioning system 104 can be provided to customers as a subscription service by an owner of the provisioning system 104. Alternatively, cloud platform 102 can be a private cloud operated internally by an industrial enterprise. An exemplary private cloud can comprise a set of servers hosting the industrial application provisioning system 104 and residing on a corporate network protected by a firewall.

The industrial application provisioning system 104 is accessible by application developers and application users to facilitate publication and sharing of industrial automation applications via the cloud platform 102. In general, industrial software applications can be developed and submitted to the industrial application provisioning system 104 by a development workstation 112 having cloud access capability. In an exemplary configuration, development workstation 112 may access the industrial application provisioning system 104 through a separate cloud interface 110, where the development workstation 112 connects to the cloud interface 110 through a physical or wireless local area network or radio link. In another exemplary configuration, cloud interface 110 may be integrated with the development workstation 112, which accesses the cloud platform 102 directly using the integrated cloud interface.

Client device 116 (typically associated with an industrial facility or enterprise) can access one or more libraries of published industrial automation applications maintained by the industrial application provisioning system 104. Similar to the development workstation 112, client device can access the industrial application provisioning system 104 and associated cloud-based services via a cloud interface 114, which can be internal to the client device 116 or a separate cloud gateway communicatively connected to the client device 116. Client device 116 may be any suitable device capable of submitting search criteria to the industrial application provisioning system 104 and receiving one or more industrial applications from the provisioning system, including but not limited to a desktop computer, a laptop, or a cloud-capable mobile device such as a mobile phone or tablet computer.

Client device 116 can also be a cloud-capable industrial device, such as an industrial controller (e.g., programmable logic controllers or other types of programmable automation controllers); a field device such as sensor or a meter; a motor drive; a human-machine interface (HMIs) station; an industrial robot; a barcode marker or reader; a vision system device (e.g., vision camera); a smart welder; or other such industrial devices. Allowing industrial devices to access the industrial application provisioning system 104, either directly or through a protected cloud interface or gateway, can offer a number of advantages, such as allowing industrial devices to automatically retrieve updates to their native industrial software applications when such updates are published to the cloud platform 102. Industrial client devices 116 may include smart configuration capability, enabling the industrial devices to automatically detect and communicate with the cloud platform 102 upon installation at a facility, simplifying integration with existing cloud-based provisioning, data storage, analysis, or reporting services provided by the cloud platform 102.

Figure 2:
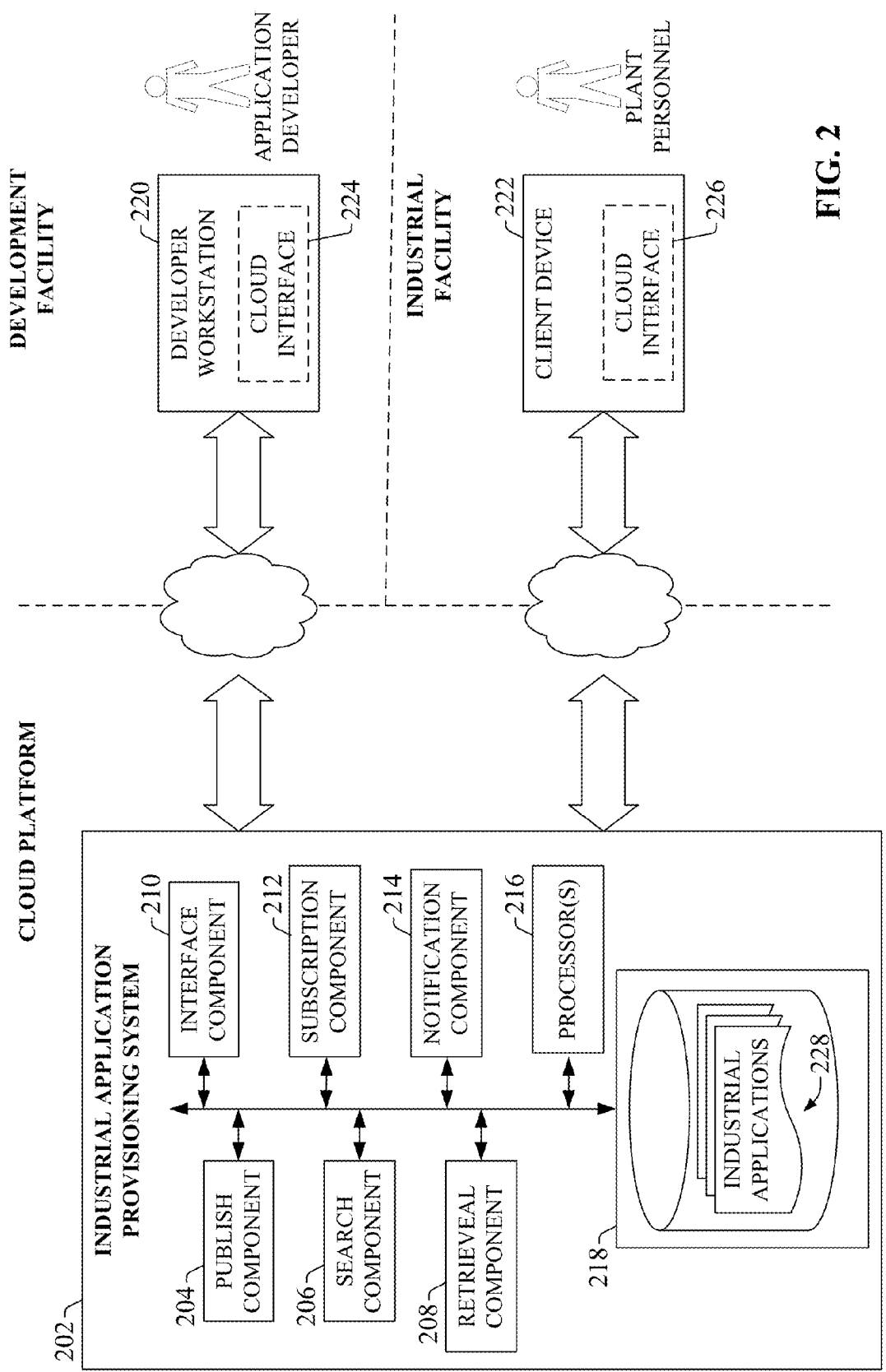
FIG. 2 is a block diagram of an exemplary industrial application provisioning system for receiving, starchy, and provisioning industrial automation applications through a cloud platform.

FIG. 2 is a block diagram of an exemplary industrial application provisioning system that can be used to receive, store, and provision industrial automation applications through a cloud platform. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial application provisioning system 202 can include a publish component 204, a search component 206, a retrieval component 208, an interface component 210, a subscription component 212, a notification component 214, one or more processors 216, and memory 218. In various embodiments, one or more of the publish component 204, search component 206, retrieval component 208, interface component 210, subscription component 212, notification component 214, one or more processors 216, and memory 218 can be electrically and/or communicatively coupled to one another to perform one or more of the functions of the industrial application provisioning system 202. In some embodiments, components 204, 206, 208, 210, 212, and 214 can comprise software instructions stored on memory 218 and executed by processor(s) 216. The industrial application provisioning system 202 may also interact with other hardware and/or software components not depicted in FIG. 2. For example, processor(s) 216 may interact with one or more external user interface devices, such as a keyboard, a mouse, a display monitor, a touchscreen, or other such interface devices.

Publish component 204 can be configured to receive submission of an industrial automation application from a remote client device (e.g., a development workstation 220 having a cloud interface 224) via a cloud platform and publish the industrial automation application to one or more application libraries 228. As illustrated in FIG. 2, the one or more application libraries 228 can be stored in memory 218. In some embodiments, memory 218 can comprise multiple storage devices (e.g., a network of storage servers comprising a cloud platform) to allow for storage of large numbers of industrial applications across multiple application libraries. Since industrial application provisioning system 202 resides on a cloud platform, the number of application libraries 228 can be expanded as needed to accommodate a growing number of published industrial applications and related software components.

Search component 206 can be configured to receive search criteria from a remote client device (e.g., client device 222, via cloud interface 226) via the cloud platform and identify a subset of the industrial applications in the library 228 matching the received criteria. Retrieval component 208 can retrieve the subset of industrial applications identified by the search component 206 and deliver the identified applications to the originator of the search request. This can include sending the industrial applications to the requesting client device 222 over the cloud platform, or sending only a set of indicators identifying the subset of industrial applications.

Interface component 210 can be configured to establish communication and exchange data with remote devices. Accordingly, interface component 210 can authenticate a client device or user wishing to access the provisioning system 202, receive industrial application submissions, receive search criteria, and send retrieved industrial applications and other user feedback to the remote devices.

One or more embodiments of the industrial application provisioning system 202 can allow users to subscribe to receive notifications or application updates relating to selected industrial applications or application categories. Accordingly, subscription component 212 can be configured to receive and manage subscription requests from remote clients, and notification component 214 can be configured to deliver notifications to the remote clients when new or updated industrial applications corresponding to the subscription requests become available. For example, subscription component 212 can store association information (e.g., in memory 218) that associates a set of subscription criteria with one or more devices or users. The subscription component can then determine when a new industrial application or an update to an existing industrial application matching the subscription criteria is published to the application library 228, and instruct notification component 214 to deliver notifications to the subscribing client devices.

The one or more processors 216 can perform one or more of the functions described herein with reference to the systems and/or methods disclosed. Memory 218 can be a computer-readable storage medium (or multiple storage media) storing computer-executable instructions and/or information for performing the functions described herein with reference to the systems and/or methods disclosed.

Figure 3:
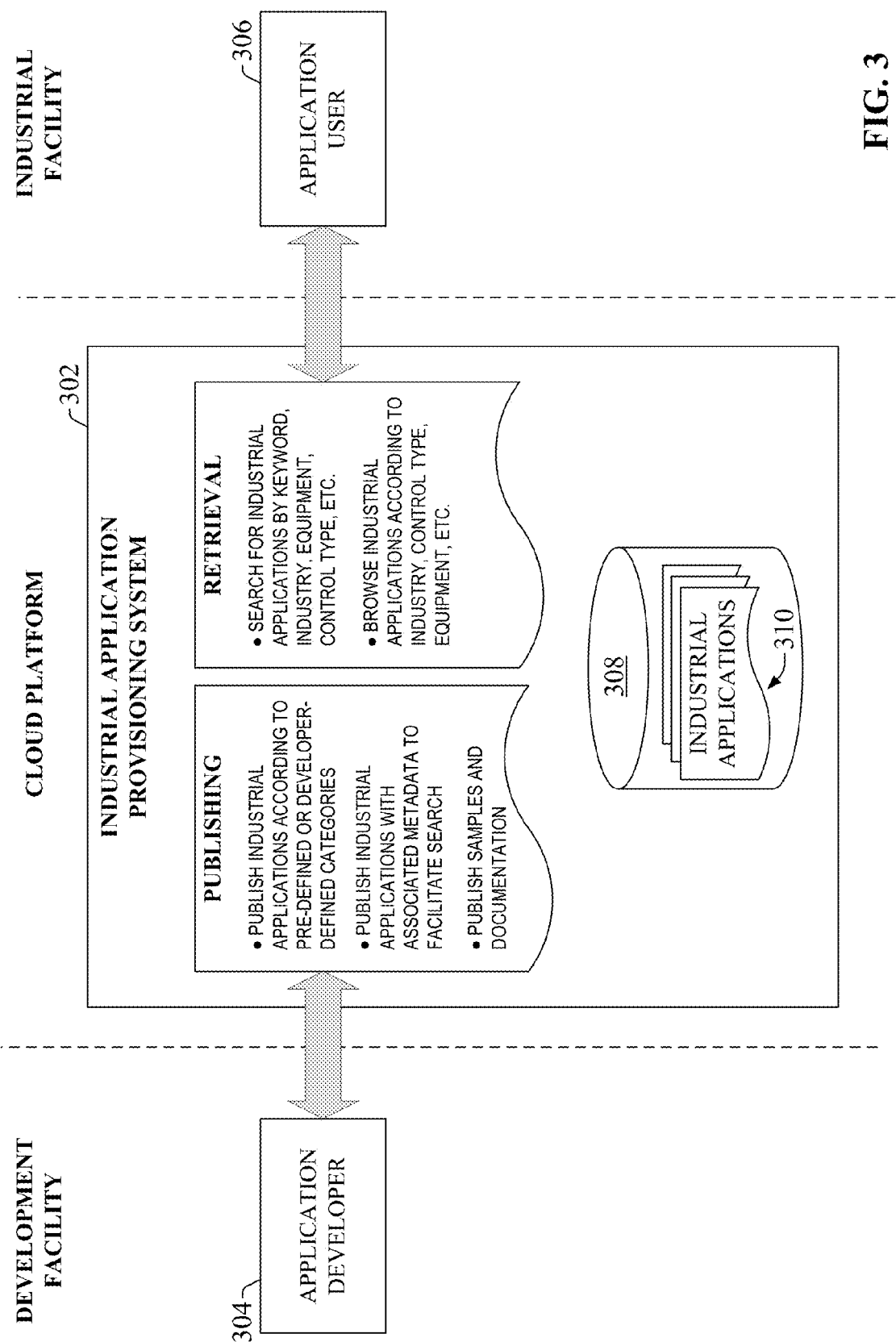
FIG. 3 illustrates a general overview of a cloud-based industrial automation application library.

FIG. 3 illustrates a general overview of a cloud-based industrial automation application library. Industrial application provisioning system 302 can reside on a cloud platform as described above. The cloud platform is accessible via a generic internet layer from any location by devices having suitable access credentials. Industrial application provisioning system 302 can manage one or more application libraries 310 on cloud-based data storage 308. The application libraries 310 can comprise a plurality of published industrial automation applications cataloged according to a hierarchical, industry-specific storage schema, to be discussed in more detail below. Since the cloud platform allows storage and processing to be easily expanded as needed, virtually any number of application library instances can be created in connection with the industrial application provisioning system 302, allowing users to search multiple libraries to find relevant applications, application code snippets, application add-on modules, etc.

Exemplary industrial applications and related components suitable for storage in the application libraries 310 can include, but are not limited to, industrial control programs or modular code segments for performing specific industrial control tasks (e.g., applications that can generate and deliver control instructions to industrial devices based on analysis of near real-time system data or other factors), visualization applications, externally defined graphical elements (EDGE definitions) that can be imported into a visualization application during interface screen development, plant reporting applications, Enterprise Resource Planning (ERP) applications, manufacturing execution system (MES) software, firmware for industrial devices, software add-ons for implementing electronic signatures, or other such applications. In one or more embodiments, the system can facilitate publication and retrieval of validated application code, which is code that has been validated pursuant to one or more defined industry standards (e.g., FDA validated code for pharmaceutical applications). The application libraries 310 can also store certified code (e.g., for safety-related industrial applications) and secure application code that has been digitally signed to ensure authenticity.

Configuration files or configuration data for industrial devices may also be published to application libraries 310 for distribution to end users. For example, in order to simplify configuration of a variable frequency drive for a desired mode of operation or for use in a particular type of automation application, a configuration file containing parameter values for the drive can be published to application libraries 310. The parameter values represent device settings that configure the drive for the desired mode of operation. Thus, an engineer or maintenance personnel can search for and retrieve the configuration file from the application libraries 310 and apply the configuration file to the drive, mitigating the need to determine suitable parameter values through trial-and-error during testing.

The application libraries 310 may also include industrial software widgets or dashboards developed by original equipment manufacturers (OEMs) that facilitate monitor and/or control of their proprietary equipment. In addition to the industrial applications and related components, the application library 310 can include associated help files, usage tips, frequently-asked-questions (FAQs), instructional videos, or other such materials to guide users in connection with using the respective applications.

The industrial automation provisioning system 302 can also be used to facilitate code sharing between software developers over the cloud platform. For example, software developers working in geographically remote locations on a common software project may publish software fixes or new code blocks to the provisioning system 302 so that co-developers can access the new or updated code during development. Thus, the industrial automation provisioning system 302 can facilitate provisioning of not only complete industrial applications, but also add-on functional modules for such applications, application upgrades or bug fixes, extension packs, etc. Publication and provisioning of such modular application components can be performed independently of the provisioning of the applications themselves.

As noted above, the industrial application provisioning system 302 can store industrial applications according to an industry-specific, hierarchical cataloging schema. That is, application developers 304 can publish their new or modified industrial applications according to pre-defined industry-specific categories and sub-categories supported by the catalog's storage structure. Industrial application provisioning system 302 can support a hierarchical arrangement of these categories and sub-categories to simplify subsequent location and retrieval of industrial automation applications or code using browsable search features. Some embodiments of the provisioning system 302 can also provide a means for application developers 304 to define their own categories for a given industrial application, thereby affording designers a degree of freedom in expanding the hierarchical storage structure of the application libraries 310 as new areas of control evolve. The provisioning system 302 also supports publishing of samples and documentation together with the published industrial applications.

Authorized application users 306 wishing to locate and retrieve an industrial application can interact with the cloud-based provisioning system 302 through a search client served by the provisioning system 302 to the user's client device. The search client can support keyword-based querying of the libraries 310 and/or a browsable interface that allows the user to navigate the library hierarchy. Both keyword querying and browsed searching permit searching for a given industrial application based on such criteria as applicable industry (e.g., automotive, pharmaceutical, waste water treatment, etc.), type of control project (e.g., motion control, batch processing, material handling, etc.), type of application required, or any other suitable pre-defined or user-defined category.

Figure 4:
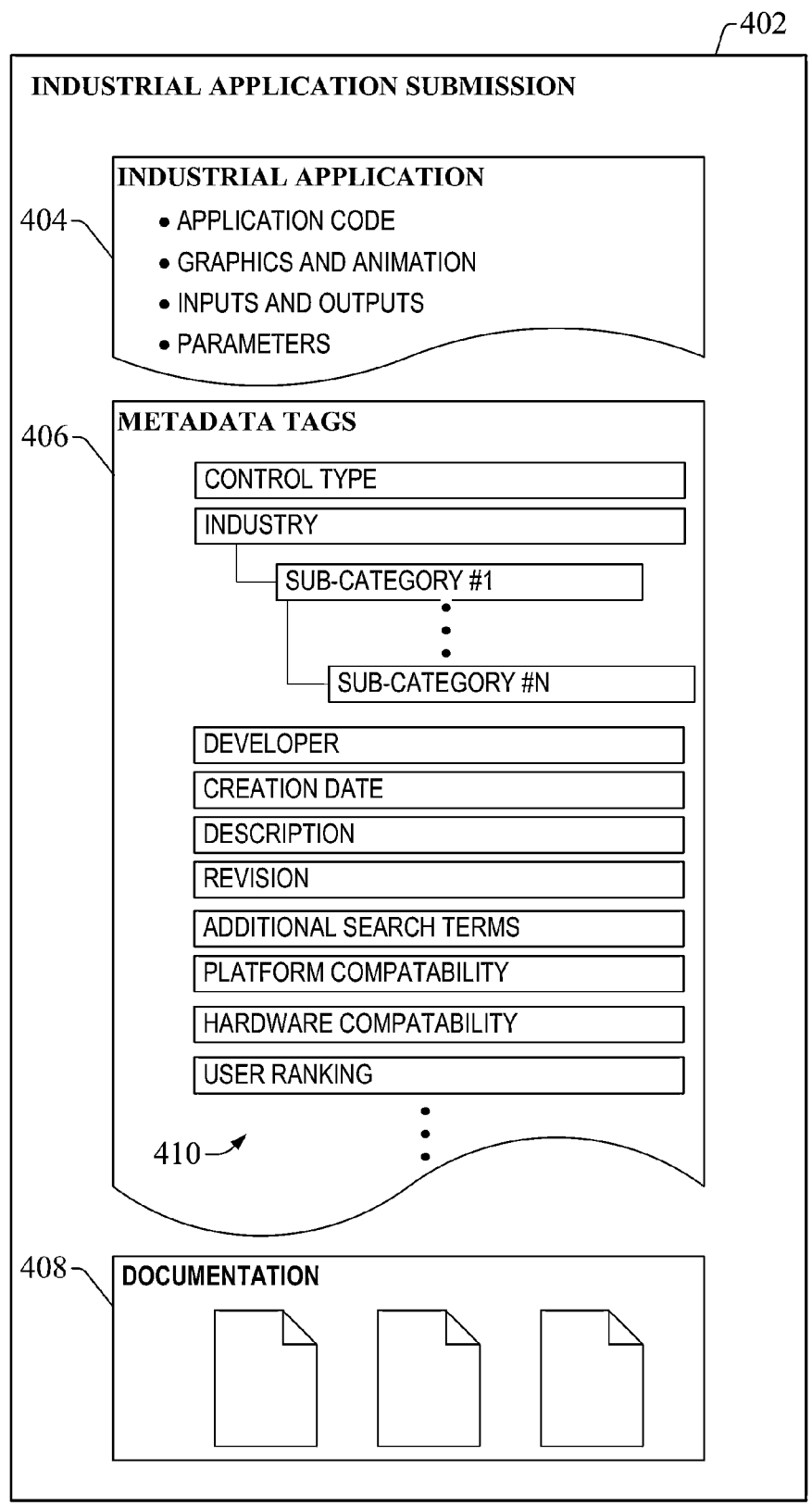
FIG. 4 illustrates an exemplary industrial application submission for publication on a cloud platform.

FIG. 4 depicts an exemplary industrial application submission that can be provided to the industrial application provisioning system for storage and publication on the cloud platform. Industrial application submission 402 can include the application 404 itself and any documentation 408 the developer chooses to associate with the application. Documentation 408 can include instructions and guidelines for using the application 404, such as help files, tips, FAQs, instructional videos, or other such documentation. Submission 402 can also include one or more metadata tags 406 containing information about the industrial application 404 being submitted. Metadata tags 406 can comprise a number of data fields 410 that can be used by the cloud-based provisioning system to store, locate, and retrieve the industrial application 404.

In some embodiments, the industrial application provisioning system can serve a publishing interface to the developer's device designed to facilitate submission of the industrial application to the provisioning system. Using this publishing interface, the developer can set values for the metadata tags' data fields using tagging functionality provided by the publishing interface. Some metadata tag values may also be set automatically generated during development of application.

Exemplary metadata tags 406 can include the following data fields:

Control Type: The type of industrial control to which the application 404 relates. For example, the Control Type field can indicate whether the application 404 relates to discrete control systems or process control systems.

Industry: The industry or business in which industrial application 404 is intended to be used. Exemplary values for the Industry field include "Automotive," "Pharmaceutical," "Wastewater Treatment," "Oil and Gas," "Power," "Food and Beverage," "Material Handling," "Metalforming," or other suitable industrial categories.

Category and sub-categories: Hierarchical classification tiers used to determine how the industrial application 404 is to be classified within the provisioning system's industry-based hierarchy. The categories and sub-categories can specify particular industrial devices or equipment that the industrial application 404 is intended to monitor or control, a type of industrial process in which the application 404 is applicable (e.g., batch processing, material handling, motion control, vision, die casting, etc.), a type of application (e.g., HMI graphic, widget, controller code, firmware, etc.), or other such pre-defined or user-defined sub-categories.

Developer, Creation Date, Description, Revision: Name of the individual or organization submitting the industrial application 404, date of creation, functional description, and revision number of industrial application 404.

Additional Search Terms: Search terms and keywords not included in the other metadata fields that the developer wishes to associate with the industrial application 404 to ensure the definition is identified in relevant catalog searches.

Platform Compatibility: List of software platforms (e.g., operating systems) compatible with the industrial application 404.

Hardware Compatibility: List of hardware platforms compatible with the industrial application 404. This field can include identification of one or more industrial devices on which the application is designed to execute, or which the application is intended to monitor and/or control.

User Ranking: A quality ranking for the application 404, calculated as an average or aggregate of quality rankings received from multiple users of the application 404. Such rankings can be provided to the provisioning system as user feedback from users who have downloaded and used the industrial application 404.

It is to be appreciated that the fields depicted in exemplary metadata tag 406 are not intended to be exclusive, nor does the metadata tag require all data fields depicted in FIG. 4 in order to fall within the scope of this disclosure. For example, metadata tag 404 can also include fields indicating that the developer wishes to charge for use of the submitted industrial application 404. Such fields can include data specifying a desired purchase price for the industrial application and financial routing information instructing the provisioning system where to submit electronic payments received in conjunction with the download or use of the industrial application 404.

Additionally, read-write permissions for the respective fields can vary in accordance with their functions. For example, the Creation Date field can be a read-only field that is automatically set to the date when the industrial application 404 was last modified. Other fields, such as the Additional Search Terms field, can have full read-write attributes, thereby allowing a user to enter data freely. Still other data fields can be populated by selecting an entry from a drop-down menu or other list associated with the data field, where such menus are provided by the client interface served by the provisioning system. In one or more embodiments, the Control Type, Industry, Category, and/or Sub-category fields can incorporate such drop-down menus, which can be populated by the provisioning system to correspond with the Control Type, Industry, Categories, and Sub-categories comprising the storage hierarchy of the application library.

Figure 5:
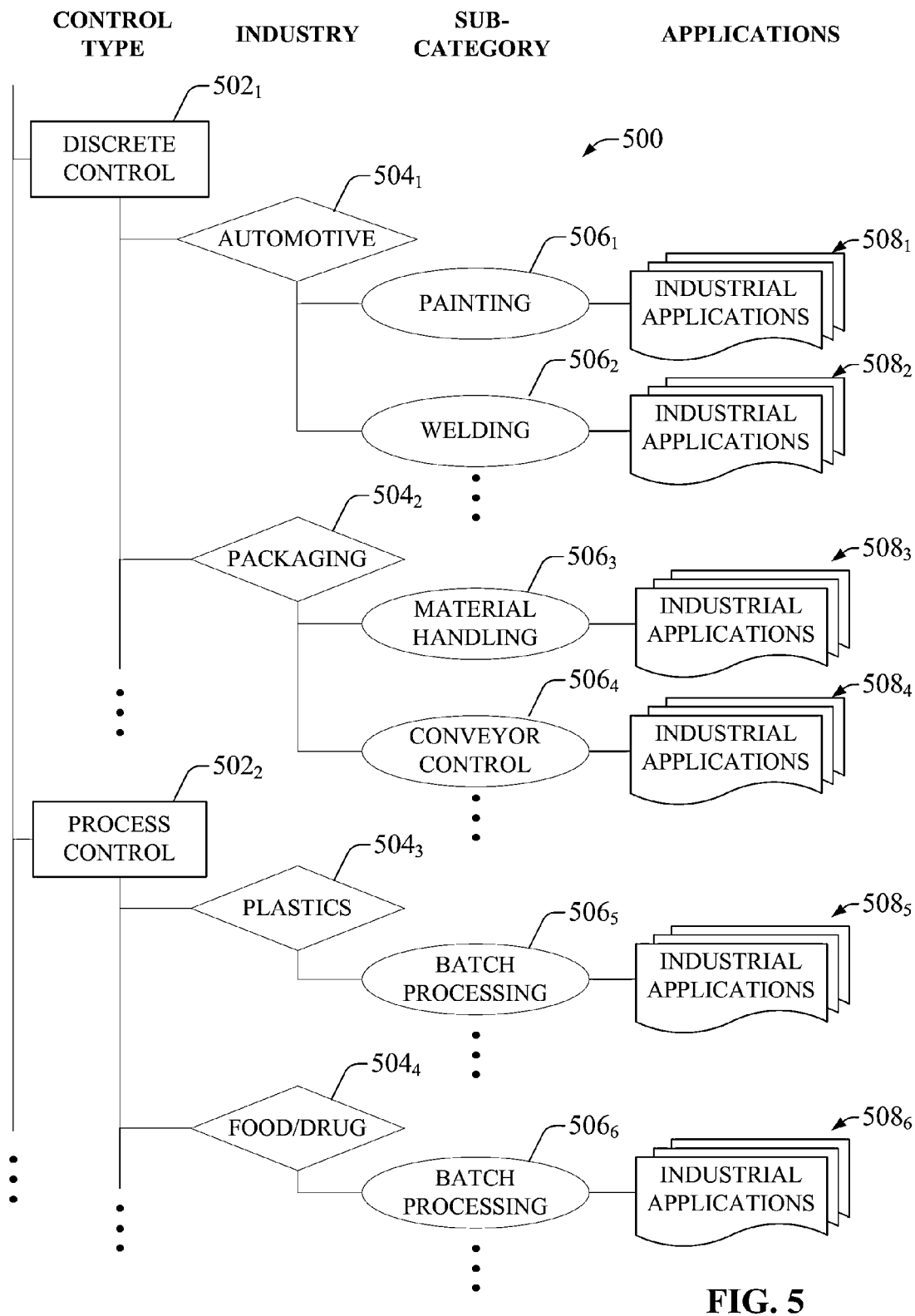
FIG. 5 illustrates an exemplary hierarchy of industry-specific classifications for storage and retrieval of industrial applications.

As discussed above, industrial applications submitted to the provisioning system of the present disclosure can be classified within a cloud-based application library according to a hierarchy of industry-specific categories to facilitate guiding a user to a desired industrial application. FIG. 5 depicts an example of such a hierarchy. In this example, industrial applications $508_1$-$508_6$ are organized within a three-tiered hierarchy comprising a Control Type tier, an Industry tier, and a Sub-Category tier, with each tier comprising one or more classification nodes having appropriate navigational interdependencies. Although FIG. 5 depicts only three tiers, it is to be appreciated that additional tiers can be included within the hierarchy without deviating from the scope of this disclosure.

Two exemplary Control Type classifications are depicted in FIG. 5—Discrete Control $502_1$ and Process Control $502_2$. Each of these Control Type classifications are shown as having respective Industry classifications $504_1$-$504_4$, with each Industry classification having one or more sub-categories $506_1$-$506_6$ specifying a particular type of industrial process within the respective industries. Industrial applications $508_1$-$508_6$ stored in the provisioning system's libraries are cataloged within this browsable industry-specific hierarchy such that groups of applications are associated with a pathway through the hierarchy. For example, industrial application group $508_5$ includes applications relating to batch processing in the plastics industry. Since some industrial applications may be useful in multiple types of industrial processes, a given industrial application may be associated with multiple paths in the hierarchy 500.

It is to be appreciated that the hierarchical format depicted in FIG. 5 is only intended to be exemplary, and that any suitable arrangement of tiered categories can be employed without deviating from the scope of this disclosure. For example, although Control Type is depicted as the highest tier of the example hierarchy in FIG. 5, a possible alternative arrangement could assign Industry as the highest tier, while the Control Type classifications could reside on a lower tier of the hierarchy branching from the Industry classifications. Moreover, the hierarchy 500 can comprise any number of hierarchical tiers to achieve a desired degree of classification granularity. By storing industrial applications in accordance with hierarchy 500, users having access to the cloud platform can be guided to the subset of stored industrial applications suitable for their needs by navigating the hierarchical classifications until a desired subset is identified. To facilitate efficient browsing, the set of Categories and Sub-Categories depending from a given parent Industry can be specific to that industry, ensuring that the selected set of stored industrial applications is progressively narrowed to include only those classifications and definitions that are industry-appropriate as the user navigates the tiers of the hierarchy.

Figure 6:
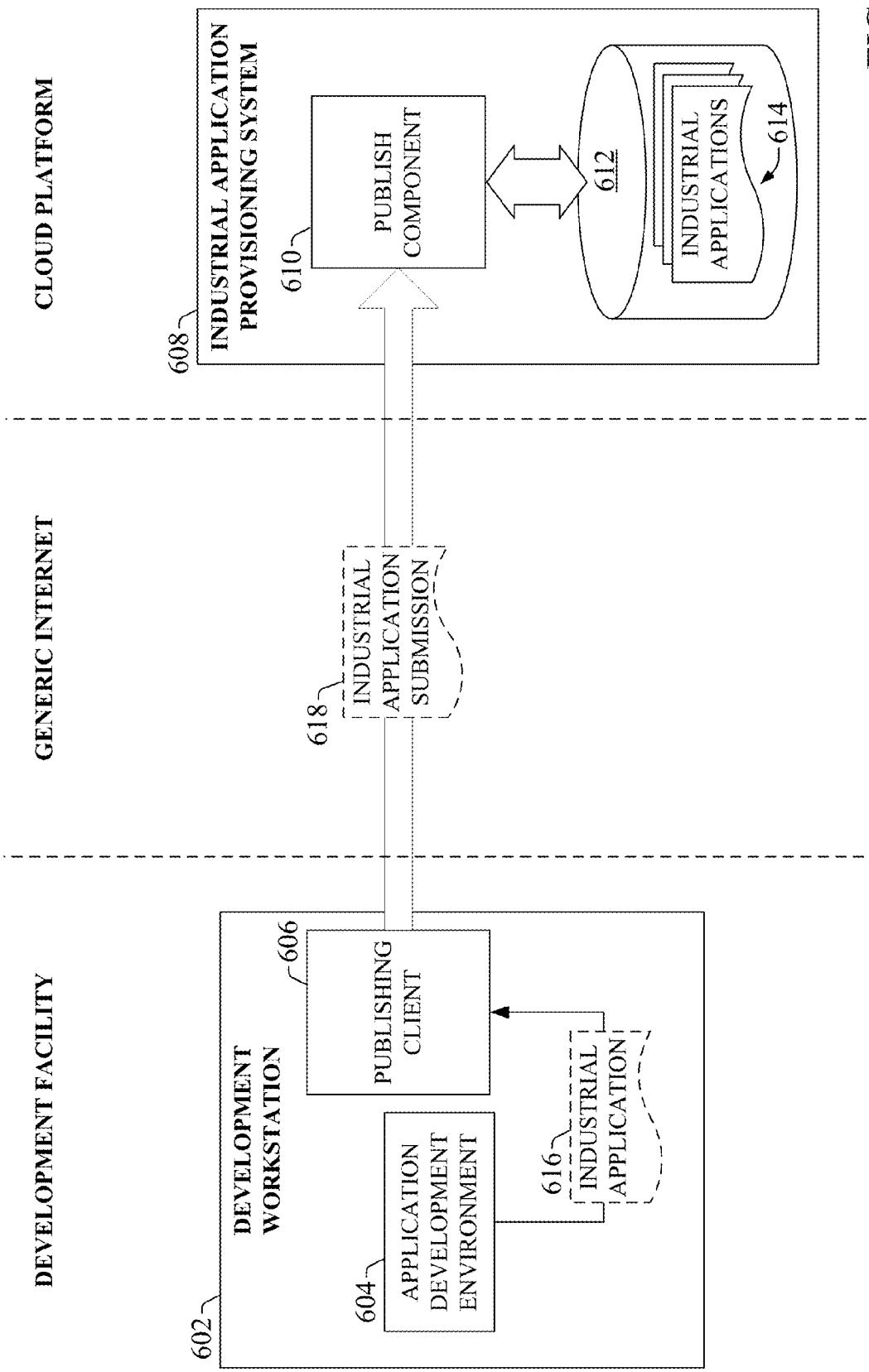
FIG. 6 is a block diagram illustrating the interactions between an industrial application development workstation and a cloud-based industrial application provisioning system to facilitate publication of a new or modified industrial application.

FIG. 6 illustrates the interactions between an industrial application development workstation and a cloud-based industrial application provisioning system to facilitate publication of a new or modified industrial application. Industrial application provisioning system 608 operates on a cloud platform (similar to cloud platform 102 of FIG. 1) accessible to authorized users via a generic Internet layer. In this example, an industrial application is submitted to the provisioning system 608 by the development workstation 602 on which the application was developed. However, it is to be appreciated that any cloud-capable device having publishing privileges can submit an industrial application to the provisioning system 608 regardless of the device on which the application was developed.

Application development environment 604 runs on development workstation 602 and is used to develop an industrial application 616, which is to be submitted to the provisioning system 608. Application development environment 602 can comprise any suitable design tool or programming platform that provides a developer the means to create or modify an industrial application for shared use. In some scenarios, application development environment 604 will be a stand-alone development platform. However, some embodiments of the industrial application provisioning system 608 can provide a remote development environment to cloud-capable computing devices for development, testing, and debugging of industrial applications. In such embodiments, this cloud-based development environment can allow users to leverage cloud resources (e.g., storage, processing, bandwidth, etc.) to develop industrial applications for subsequent storage and publication on the provisioning system 608. To facilitate access to this cloud-based development environment, the provisioning system 608 can serve a development interface to the development workstation 602 that serves as an interface to the development environment. This can allow the development workstation 602 to access and utilize the development environment from an authorized cloud-capable device. In some embodiments, the cloud-based development environment can include integrated testing and simulation capability, allowing applications in progress to be simulated, tested and debugged using cloud resources provided by the cloud platform. Applications in development may also be stored on the cloud platform between development sessions. The use of cloud resources to develop industrial applications in this manner can also facilitate sharing of development tasks between geographically diverse application developers, since multiple developers at different locations can access the application in progress from any authorized cloud-capable computing device.

When a new or modified industrial application is ready for submission to the provisioning system 608, the developer can invoke publishing client 606. The publishing client 606 can be a remote web-based client served by the provisioning system 608, or a locally executed client on development workstation 602 that can be invoked and communicatively linked to the provisioning system 608 over the Internet. Publishing client 606 can include functionality that allows a developer to associated metadata with the industrial application that can subsequently be used by the provisioning system 608 to classify the industrial application within an industry-specific storage hierarchy, as discussed above in connection with FIGS. 4 and 5. Publishing client 606 can also include functionality that allows the developer to submit documentation for the industrial application to the provisioning system 608. When the developer has prepared the industrial application for submission and associated all desired metadata and documentation with the application, publishing client 606 can be instructed to send an industrial application submission 618 to the provisioning system 608 on the cloud platform. In some embodiments, industrial application provisioning system 608 may only allow application submission by registered users. Accordingly, the provisioning system 608 can perform a suitable authentication procedure to ensure that the user submitting the application submission 618 is an authorized user of the system.

The industrial application submission 618 is submitted to the provisioning system 608, where a publish component 610 adds the application to the industrial application library 614. Application library 614 can be maintained on one or more data stores 612 on the cloud platform. Publish component 610 can parse the metadata tags included in the application submission 618 (e.g., metadata tags 406 of FIG. 4) to determine proper classification of the industrial application within the library's storage hierarchy. As discussed above in connection with FIGS. 4 and 5, the submitted industrial application can be classified within the library 614 according to a hierarchy of industry-specific categories to facilitate guiding a user to a desired industrial application suitable for a given industry and task. For example, publish component 610 can read the Control Type, Industry, Category, and Sub-Category fields of metadata tag 406 of FIG. 4 and associate the industrial application with the hierarchical path corresponding to the values in those fields. To facilitate simple and flexible cataloging of the industrial application, publishing client 606 can allow developers at development workstation 602 to either select values for those fields from a list of classifications already existing in library 614, or to define new designer-supplied industry and/or category classifications. Thus, if publish component 610 determines that a Sub-Category field in metadata tags 406 contains a new classification, the publish component 610 can create a new branch at an appropriate location within the library hierarchy corresponding to the new designer-supplied classification, and associate the new industrial application with this new pathway in the library 614.

Figure 7:
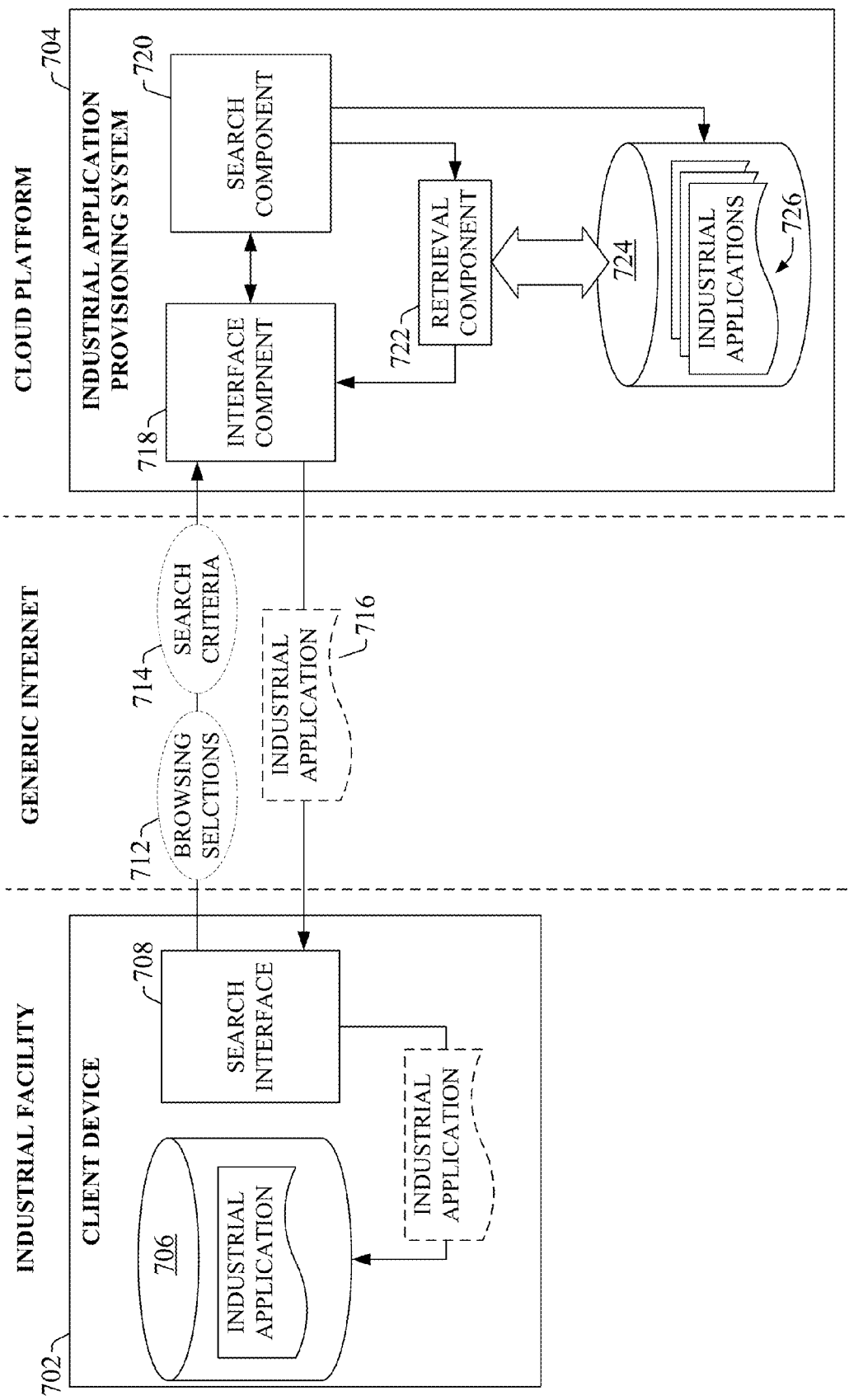
FIG. 7 is a block diagram illustrating the interactions between a cloud-capable client device and the industrial application provisioning system for location and retrieval of a desired industrial application.

FIG. 7 illustrates the interactions between a cloud-capable client device and the industrial application provisioning system for location and retrieval of a desired industrial application from the catalog. Client device 702 can be any suitable Internet-capable computing device having authorization to access industrial application provisioning system 704 residing on a cloud platform (similar to cloud platform 102 of FIG. 1). Typically, client device 702 will be associated with an industrial facility. Client device 702 can invoke search interface 708 to facilitate access to the provisioning system 704. Search interface 708 can be a local application that executes on client device 702 and that is configured to connect to the cloud platform and interact with the provisioning system 704. Search interface 708 may also be a specialized interface served to the client device 702 by the provisioning system 704 in response to a request from the client device 702 to access the provisioning system 704. Search interface 708 can include a set of graphical user interface (GUI) elements for submitting search criteria to the provisioning system 704, browsing the contents of the provisioning system's application libraries, receiving selection input from a user of the client device 702, providing status and feedback information to the user, or any other suitable graphical elements that facilitate search and retrieval of desired industrial applications on the cloud platform.

In one or more embodiments, location and retrieval of an industrial application can be effected by submitting keyword-based search criteria 714 to the provisioning system 704 via search interface 708. Search interface 708 submits the search criteria 714 to the cloud-based provisioning system 704 across a generic Internet layer. Search criteria 714 can comprise one or more keywords entered by the user using the search interface 708. Typically, a user will submit keywords that identify one or more of an industrial domain, a control type (e.g., discrete control, process control, etc.), a type of automation application, a device or piece of equipment in use, an industry standard, or any other terms that can be used by the provisioning system to identify a desired subset of industrial applications stored in industrial application library 726. In one or more embodiments, a subset of the search criteria 714 can also be inferred by the search interface 708 based in part on extrinsic data relating to the user's existing control system, as will be discussed in more detail below.

When search criteria 714 is submitted to the provisioning system 704, an interface component 718 receives the search criteria 714 and passes the criteria to a search component 720, which identifies a subset of industrial applications stored in application library 726 (similar to application library 310 of FIG. 3 and 614 of FIG. 6) that satisfy the submitted criteria. To determine whether a given stored industrial application meets the search criteria 714, search component 720 can cross-reference the search terms contained within the search criteria 714 against the given industrial application's metadata tags, hierarchy classifications, inherent properties of the application (e.g., parameters, inputs and outputs, data types, animation types, etc.), or other defined or inherent properties of the industrial application.

Moreover, one or more embodiments of search component 720 can support "approximate match" searching, such that exact matches between the submitted search criteria 714 and a potentially relevant industrial application's metadata or properties is not necessary in order for the industrial application to be selected for inclusion in the retrieved subset. In this regard, any suitable "fuzzy search" methodology can be employed to ensure that useful industrial applications are returned even in the absence of an exact match. In one exemplary approach, upon receipt of search criteria 714, search component 720 can calculate one or more figures of merit for each industrial application in the library 726 relative to the search criteria. Each application's figure of merit is a relative measure of how relevant the given definition is likely to be to the search criteria. For example, if a search criterion stipulates that a requested industrial application is to be used in an automotive HMI application, the search component 720 can generate an "industry" figure of merit for each industrial application in the library 726 indicating a relative applicability to the automotive industry. Industrial applications whose metadata explicitly specifies "automotive" as an applicable industry will be given the highest figure of merit. Applications whose industry metadata specifies a different industry but having similarities to the automotive industry (e.g., commonly employs similar equipment or processes, often produces materials or products used by the automotive industry, etc.) will be given a comparatively high (though not the highest) figure of merit with respect to industrial applications designed for a non-related industry. When all figures of merit have been identified, search component 720 can identify the subset of industrial applications having a figure of merit above a threshold value as being sufficiently relevant to the search criteria. According to one or more embodiments, multiple figures of merit can be calculated for each industrial application for a given set of search criteria, where each figure of merit relates to a particular search dimension or aspect (e.g., industry, control type, category, desired functionality, etc.). In such embodiments, a composite figure of merit can be computed based on the individual figures of merit for the various search dimensions, and the relevant subset of industrial applications can be selected by the search component 720 based on this composite value.

After the subset of relevant industrial applications from library 726 has been identified, the provisioning system 704 can render a list of the identified applications on the search interface 708 for selection by the user. Each item in the list can include a description of the application, including information derived from the application's metadata (e.g., control type, industry, function, etc.). The search interface 708 can receive input from the user indicating selection of one of the industrial applications in the list, and inform the provisioning system 704 of the user's selection. Based on the user selection, the retrieval component 722 retrieves the identified industrial application from the library 726.

In one or more embodiments, libraries 614 and 726 described above can comprise centralized, common libraries accessible to suitably authorized users across multiple locations and enterprises (e.g., via a subscription service). In some embodiments, the industrial application provisioning system can also allow users to create and maintain personal libraries on the cloud platform for storage of selected industrial applications or related software components. In such embodiments, the system allows the user to import industrial applications (or related components) into their personal cloud-based application library from other libraries (e.g., the commonly accessible library described above) or to publish their own user-developed applications and related components to the personal library. Such personal application libraries can utilize a subset of cloud resources (e.g., storage, processing, and/or bandwidth) allocated to the user or the user's business enterprise. The system can allow the user to configure these personal application libraries such that access to the applications and software components stored thereon is limited to authorized personnel within their company. In this way, the system allows the user to build custom application libraries for personal or internal use, comprising applications or associated software component of particular value or potential utility for the user or enterprise.

Figure 8:
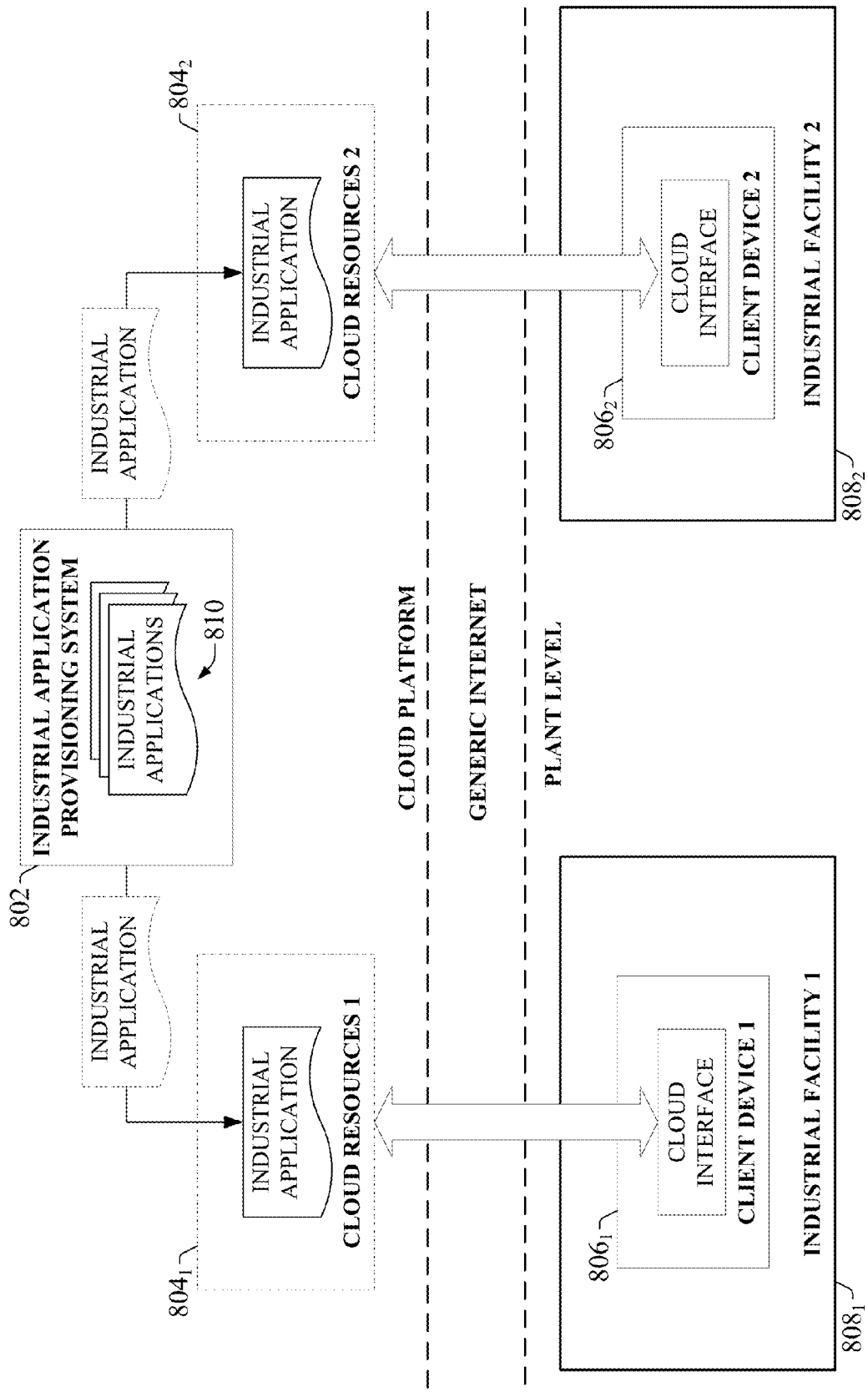
FIG. 8 is a block diagram illustrating remote execution of industrial applications using cloud resources assigned to respective industrial facilities.

In some embodiments, the provisioning system 704 can provide the retrieved industrial application 716 to the client device over the Internet for local usage. That is, the selected industrial application 716 can be downloaded from the provisioning system 704 and stored on local storage 706 at the client device. Alternatively, some embodiments of the provisioning system 704 can allow certain industrial applications to be run remotely using cloud resources provisioned to the user or to the industrial facility. FIG. 8 illustrates remote execution of industrial applications using cloud resources assigned to respective industrial facilities. Client devices 806$_1$ and 806$_2$ at respective industrial facilities 808$_1$ and 808$_2$ can access industrial application provisioning system 802 residing on a cloud platform. As in previous examples, the client devices 806$_1$ and 806$_2$ can access the cloud platform through a generic Internet layer. In the present example, each of the industrial facilities 808$_1$ and 808$_2$ are allocated respective cloud resource provisions 804$_1$ and 804$_2$, where the resource provisions 804$_1$ and 804$_2$ can comprise allocations of cloud storage, processing, and/or bandwidth provided by the cloud platform for use by the respective industrial facilities 808$_1$ and 808$_2$. For example, an owner of the cloud platform may offer subscription services to industrial facilities for use of a predetermined amount of cloud resources, which the facilities can use for off-site data storage, execution of cloud-based applications or virtual machines using portions of the cloud platform's processing capacity, or other such services.

As in previous examples, client devices 806$_1$ and 806$_2$ can search for and retrieve desired industrial applications from the application library 810 managed by provisioning system 802. However, rather than downloading the selected applications to the client devices 806$_1$ and 806$_2$ for local use at the respective facilities 808$_1$ and 808$_2$, the selected applications can instead be executed on the cloud platform using each facility's allocated cloud resources 804$_1$ and 804$_2$. In some cases, cloud-based execution of industrial applications may not be appropriate, as in the case of industrial applications comprising controller code designed to control plant floor machinery. However, many industrial applications could beneficially be maintained and executed remotely on the cloud platform as illustrated in FIG. 8. Such applications can include, for example, reporting applications, ERP and MES systems, applications designed to notify plant personnel when certain predefined plant floor conditions occur, or other such applications.

In addition to query-based searching, one or more embodiments of the industrial application provisioning system 704 can also support browsed searching of the industrial application library 726 by allowing the user to navigate the classification hierarchy until a desired industrial application is found. Returning now to FIG. 7, search interface 708 can provide a browsable interface that allows the user to select classifications corresponding to the classification nodes of the library hierarchy (e.g., hierarchy 500 of FIG. 5). For example, search interface 708 can present a list of industries represented in the library hierarchy on a home menu. Selection of an industry from this list can cause the search interface to submit a corresponding browsing selection 712 to interface component 718 of the provisioning system 704, which routes the browsing selection to the search component 720 for processing. Search component 720 can retrieve control types, application types, categories, sub-categories, and other classifications associated with the selected industry. Interface component 718 returns this information to the search interface 708, which can render the available categories associated with the selected industry and, optionally, a list of industrial applications associated with all categories and sub-categories depending from the selected industry. The list of industrial applications can be gradually narrowed as the user navigates through lower tiers of the hierarchy in this manner until the user selects an industrial application from the list or until a lowest tier of the hierarchy is reached.

One or more embodiments of the provisioning system described herein can also support implementation of corporate filters to limit selection and retrieval of applications to a subset of pre-approved industrial applications or application types. For example, some industries may require that all software used in connection with control and operation of an industrial process conform to a defined set of standards (see, for example, the 21 CFR Part 11 standards applied to the food and drug industry). Additionally, some industrial facilities may have their own set of internally defined standards, or may wish to simplify the search and retrieval process by limiting the applications returned by the provisioning system only to those applications relevant to the facility's particular industry. To ensure that only pre-approved code is retrieved from the provisioning system, one or more embodiments of the industrial application provisioning system can allow each industrial customer to define a set of corporate filters to be applied to all application searches made by plant personnel.

Figure 9:
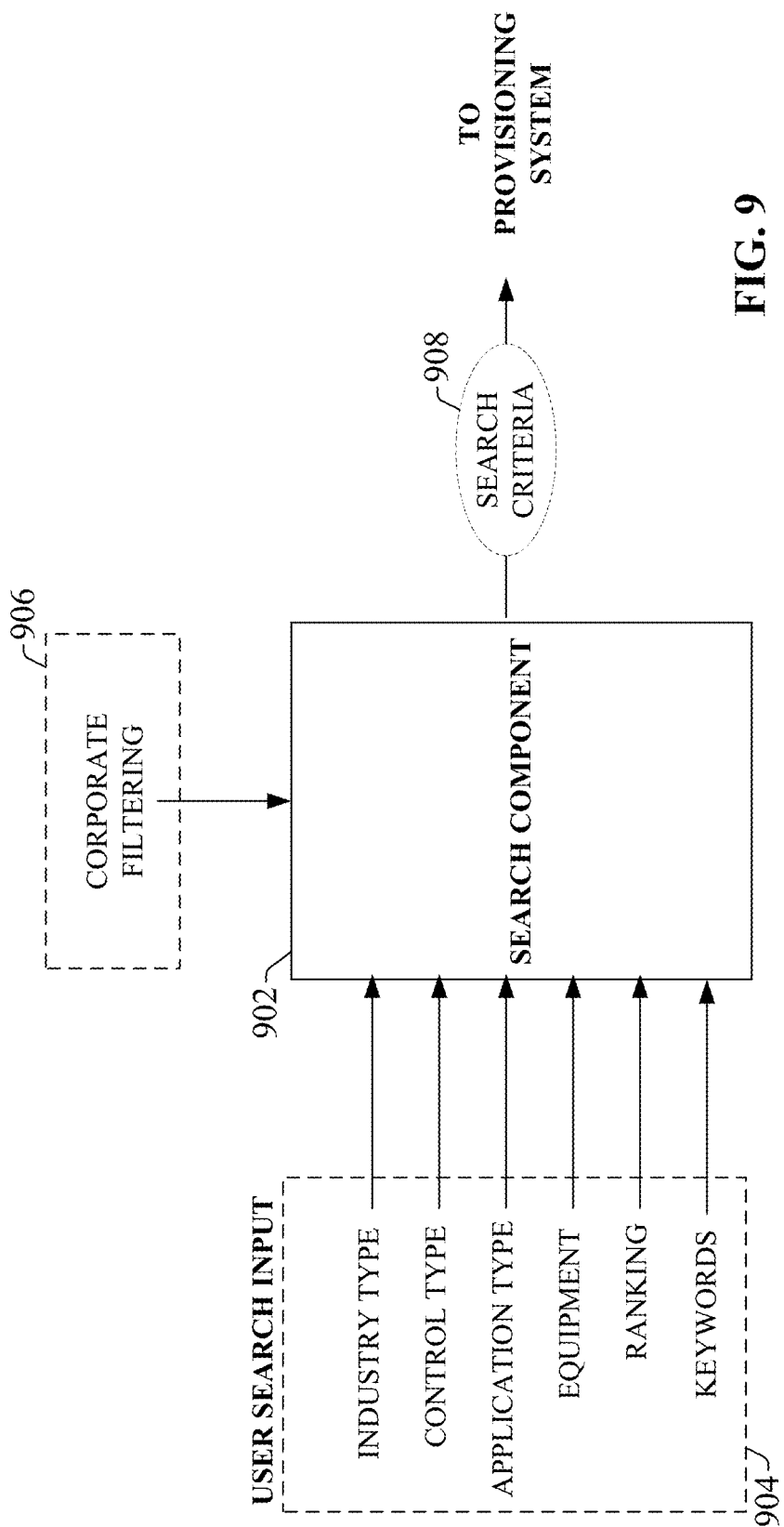
FIG. 9 illustrates an exemplary search component that employs corporate filtering.

FIG. 9 illustrates an exemplary search component that employs corporate filtering. As described in previous examples, search component 902 can receive search input 904 from a user at a client device, including one or more of a desired industry type, control type, application type, equipment in use, desired minimum user quality ranking, or one or more keywords. In addition, search component 902 is configured to apply corporate filtering criteria 906 to all searches performed for the given industrial facility. This corporate filtering 906 can be, for example, a limit on the types of applications that are allowed to be downloaded, a minimum quality ranking, specification of equipment in use to prevent download of incompatible applications, identification of an industry standard with which the facility is required to comply, or other suitable limiting criteria. The search component 902 can receive this corporate filtering 906 and the user search input 904 as inputs, and generate a composite search criteria 908 for submission to the provisioning system to facilitate location and retrieval of appropriate industrial applications.

Figure 10:
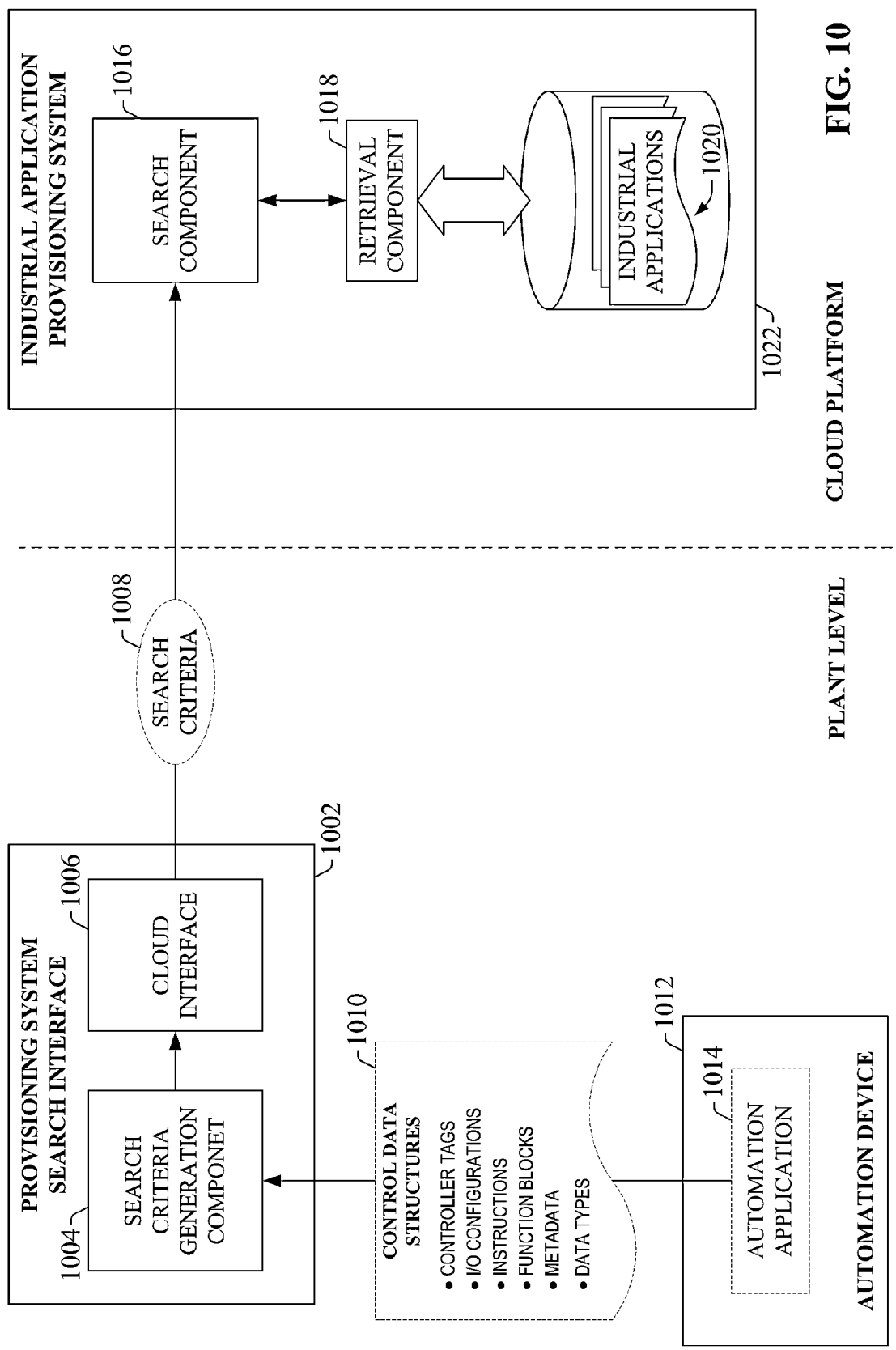
FIG. 10 is a block diagram of an exemplary application provisioning system that infers search criteria based on information read from an existing automation system.

As discussed above, some embodiments of the industrial application provisioning system can infer at least a portion of the application search criteria based in part on extrinsic data read from the user's existing control system. For example, certain control data structures, code segments, or HMI graphical elements may suggest that the user's existing system relates to a particular industry or type of industrial system, or may help to identify particular devices or equipment in use at the industrial facility without requiring the user to explicitly provide such information to the provisioning system. FIG. 10 illustrates an exemplary application provisioning system that leverages information from a user's existing control system to infer search criteria for locating relevant industrial applications on a cloud platform. As in previous examples, a client device can use a search interface 1002 (either locally executed or served remotely by the provisioning system 1022) to access industrial application provisioning system 1022. In the present example, search interface 1002 includes a search criteria generation component 1004 that can poll an automation device 1012 (e.g., an automation controller, an HMI terminal, etc.) in use at the industrial facility. In particular, the search criteria generation component 1004 can poll an automation program 1014 running on automation device 1012, such as an automation controller program (e.g., ladder logic, sequential function chart program, etc.), an HMI application, or the like, and determine one or more control data structures 1010 (e.g., function blocks, code segment, equipment identifiers, graphical elements, etc.) indicative of a particular industry, device in use, or control application type. Based on these control data structures 1010, the search criteria generation component 1004 can then infer an industry, control type, application type, or other characteristics of the user's control system, and generate at least a portion of search criteria 1008 based on these inferences. Such techniques can at least partially automate the process of locating suitable industrial applications maintained on the provisioning system 1022.

Consider an example in which automation application 1014 is a controller program residing on automation device 1012, which can be an industrial controller (e.g. programmable logic or automation controller). The control program can include a number of control data structures 1010 that assist with data management and instruction processing within the program, such as control instructions, memory tags of various data types, I/O module configurations, etc.

According to one or more embodiments, the search criteria generation component 1004 can read one or more control data structures 1010 from the automation application 1014. Control data structures 1010 extracted by the search criteria generation component 1004 can include, but are not limited to, controller tags and their associated data types (e.g., real, integer, binary, double, string, etc.), instructions and/or function blocks used in the control program, and any metadata associated with the various program elements. Search criteria generation component 1004 can also read, as control data structures, configuration information for the I/O modules associated with the automation device 1012, which are used to exchange digital and analog signaling between the automaton application 1014 and field devices comprising the controlled system.

Upon reading the one or more control data structures from automation program 1012, search criteria generation component 1004 can make an inference regarding industrial equipment in use (e.g., devices being monitored and/or controlled by automation application 1014), an industry to which the automation application 1014 relates, a type of process being controlled by automation application 1014, or other relevant characteristics of the user's system. For example, if a particular control data structure 1010 in automation application 1014 indicates that a particular type of variable frequency drive (VFD) is being controlled by automation application 1014 as part of the broader system control, the search criteria generation component 1004 may generate search criteria 1008 designed to locate a graphical object (e.g., EDGE definition) representing the identified VFD, a widget designed to read and display operational data for the identified VFD, code segments relating to motor control applications, or other such applications determined to be relevant. In another example, the control data structures 1010 may indicate that the automation device 1012 includes an I/O module designed to control a particular type of servo motor. Accordingly, based on the presence of these control data structures in the automation application 1014, the search criteria generation component 1004 can generate search criteria 1008 including the name of the vendor of the servo motor, keywords relating to servo control or motion control in general, or other such criteria.

In some cases, the generated search criteria 1008 can be based in part on a pre-defined mapping between particular data structures (e.g., function blocks, metadata keywords, I/O modules in use, etc.) and relevant search terms. For example, the pre-defined mapping can associate a controller tag's data type with a particular set of search criteria. In another example, a control data structure identifying an I/O module in use can also be mapped to another set of search criteria. Likewise, control data structures representing instructions used within a controller program can be associated with yet another set of search criteria. In this way, some embodiments of the search criteria generation component 1004 can allow a user to pre-specify search criteria to be submitted to the provisioning system 1022 for respective types of control data structures 1010.

In some embodiments the provisioning system search interface 1002 can further allow a user to define usage-based associations between control data structures and industrial application search criteria. That is, an associative link between a control data structure and one or more sets of search criteria can be conditional on how the control data structure is used in automation application 1014 (e.g., in which subroutine or control module of the control program the control structure is located). As an example of such a mapping, a user can specify that controller tags having a REAL data type and located in a "Die Cast" subroutine are to be associated with bar graph display objects, while similar tags located in a "Sand Casting" subroutine are to be associated with line graph display objects.

Search criteria generation component 1004 can read a control data structure 1010 from automaton application 1014 and cross-reference this control data structure with the pre-defined mapping. Using this information, search criteria generation component 1004 can generate provisioning system search criteria 1008 for the control data structure based on the mapping of preferred display object types. That is, for a given control data structure read from automation application 1014, the search criteria generation component can generate search criteria for locating one or more suitable graphical elements (e.g., EDGE definitions, GUI components, etc.) that can be imported into an HMI application or added to a computer desktop as a widget for visualization of and/or operator interaction with the control data structure.

The automatically generated search criteria can be submitted alone or in combination with additional user-entered search criteria. As described in previous examples, the search criteria 1008 can be provided to search component 1016 of provisioning system 1022 (e.g. through cloud interface 1006), and retrieval component 1018 can retrieve selected industrial applications identified by the search criteria 1008 from application library 1020.

Although search criteria generation component 1004 is depicted in FIG. 10 as refining the search criteria based on control data structures 1010 read from automation application 1014, one or more embodiments are also contemplated wherein search criteria generation component 1004 can poll an industrial network to identify other field devices comprising the automation system. For example, search criteria generation component 1004 can scan the network to discover devices or equipment in use as part of the automation system. Search criteria generation component 1004 can identify such devices by reading an identifier inherent in the device, such as a media access control (MAC) address. Search criteria generation component 1004 can then generate search criteria based on the device identifier to locate and retrieve any relevant industrial applications relating to such devices (e.g., graphical objects for visualizing the identified devices on an HMI application, code blocks for controlling the identified equipment, etc.).

Figure 11:
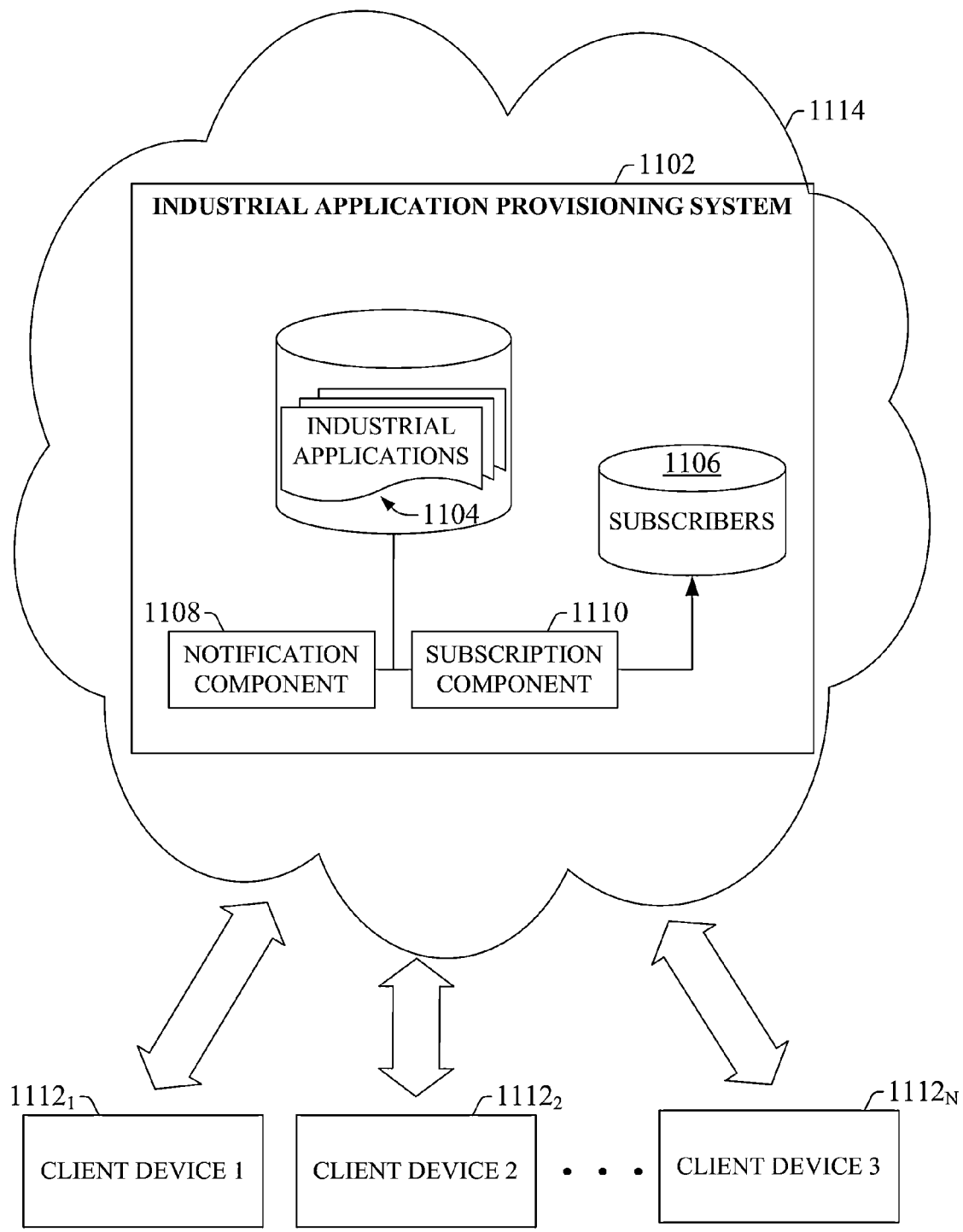
FIG. 11 is a block diagram of an exemplary cloud-based provisioning system with subscribe and notify capabilities.

One or more embodiments of the industrial application provisioning system can also allow users to subscribe to receive notifications of updates or revisions to selected industrial applications in the library. An exemplary cloud-based provisioning system having subscribe and notify capabilities is illustrated in FIG. 11. Client devices $1112_1$-$1112_N$ can be similar to client devices 702 and 806 of FIGS. 7 and 8. That is, the client devices $1112_1$-$1112_N$ can be authorized cloud-capable devices having access to industrial application provisioning system 1102 (residing on cloud platform 1114) for publishing and sharing of industrial applications. In the present example, application provisioning system 1102 can include a subscription component 1110, which receives requests from one or more of the client device $1112_1$-$1112_N$ to subscribe to selected industrial applications or categories of applications. A request to subscription component 1110 can be explicitly submitted by a user, e.g., via search interface 708 of FIG. 7. For example, users at the respective client devices $1112_1$-$1112_N$ can browse to a selected industrial application as described supra and flag the application for future notifications. The subscription component 1110 can also provide a means for the user to enter a preferred contact method for receiving notifications of revisions made to the selected industrial applications (e.g., an email address, cell phone number, etc.). Alternatively, subscription component 1110 can automatically subscribe a client device to receive notifications relating to a given industrial application when the client retrieves the industrial application from the application library 1104 maintained by the provisioning system 1102. Such automated subscriptions presume that a user will wish to acquire future revisions of an industrial application retrieved by the user for use in an industrial system. Subscription component 1110 can maintain a list of received subscription requests in a subscribers database 1106. Records in subscribers database 1106 can include, for example, a user identifier, an industrial application identifier, a preferred notification method (e.g., email, text message, voice message, etc.), and any other suitable subscription information.

Provisioning system 1102 can further include a notification component 1108 that works in conjunction with subscription component 1110. Notification component 1108 monitors the industrial application library 1104, and in particular tracks revisions made to individual industrial applications stored therein. For instance, if a new industrial application is published to the library 1104 (e.g., using the techniques described above in connection with FIGS. 4-6), notification component 1108 can determine if the newly published industrial application is a revision of a pre-existing industrial application in the library. Notification component 1108 can make this determination, for example, by reading relevant information in the metadata tags 406 (see FIG. 4).

Upon determining that the newly published industrial application is a revision of a previously published application, notification component 1108 can reference subscribers database 1106 to determine if any users are subscribed to receive notifications relating to the previously published application which served as an antecedent for the new application. If so, notification component 1108 can send a notification to the subset of clients $1112_1$-$1112_N$ on the subscription list that a new revision of the industrial application is available for retrieval from the cloud-based library 1104. Such notifications can be transmitted by the notification component 1108 to each user's preferred contact destination as defined in the subscriptions. Notification component 1108 can transmit the notifications to the appropriate users according to each user's preferred notification method as indicated in the respective subscriptions, including, but not limited to, email, text message, voice message, notification via the catalog client, etc.

Figure 12:
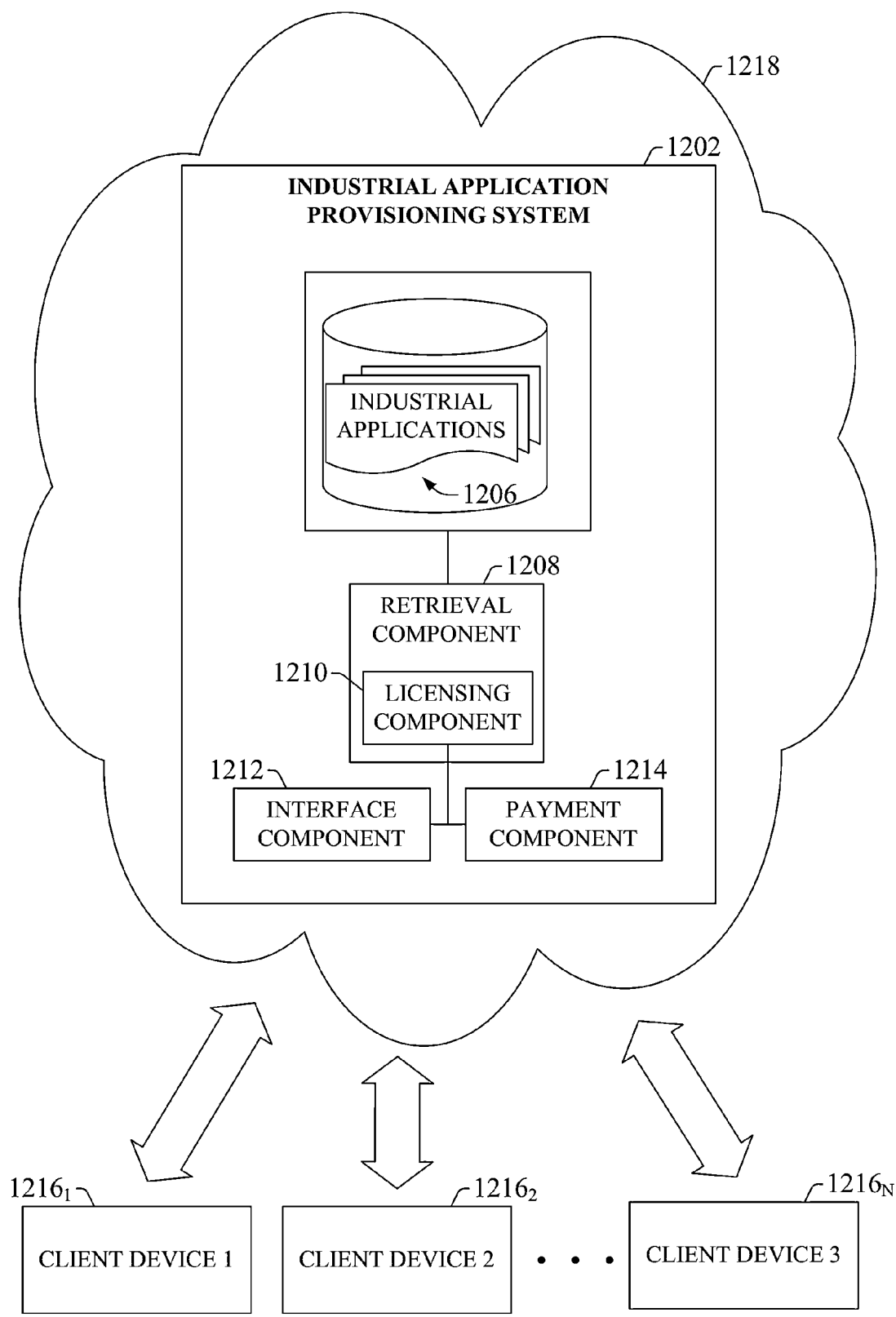
FIG. 12 is a block diagram of an industrial application provisioning system that includes a licensing component.

The industrial application provisioning system of this disclosure provides a means for developers to share their industry- and application-specific industrial applications with other users over a cloud platform, allowing users and application developers to easily leverage the experience and expertise of other developers. While some application developers may wish to publish their industrial applications for free distribution, it is understood that other application developers may wish to charge a license fee for the download and use of their applications. Accordingly, one or more embodiments of the industrial application provisioning system can include a licensing component that determines whether a requested application is associated with a license requirement, as illustrated in FIG. 12. In one or more exemplary embodiments, when an industrial application is published to the cloud-based library 1206, the metadata tags for the published application can include a field indicating whether the developer of the application wishes to apply a license requirement to the application. Associated fields can allow the application developer to specify a type of license (unlimited use, single-instance use, etc.), a desired license fee, and payment routing information. When one or more authorized client devices $1216_1$-$1216_N$ subsequently submit a request for the licensed industrial application through cloud platform 1218, interface component 1212 (similar to interface component 718 of FIG. 7) passes the request to the retrieval component 1208 for processing, as described above in connection with FIG. 7. According to the embodiment(s) illustrated in FIG. 12, retrieval component 1208 can include a licensing component 1210 that determines whether the requested industrial application has a publisher-defined license requirement.

If a license requirement is identified, a payment component 1214 can send a prompt to the client device from which the request was received, instructing the user that a payment must be submitted before the industrial application can be retrieved for use. Alternatively, the industrial application can be provided to the client device on a provisional trial basis, such that usage rights will be terminated after a defined period of time unless a license payment is received within the defined time frame. The provisioning system 1202 can provide an interface that allows the user to submit the payment electronically (e.g., by allowing the user to enter bank account routing information, credit or debit card information, electronic payment transfer information, or any other suitable payment method). Payment component 1214 can receive the electronic payment information and route the payment information to the necessary financial institutions (determined based on the financial information provided by the industrial application developer via the metadata tags). When payment has been confirmed, retrieval component 1208 can retrieve the requested industrial application and deliver the application to the client device or allow usage of the application on a set of cloud resources provisioned to the user.

Figure 13:
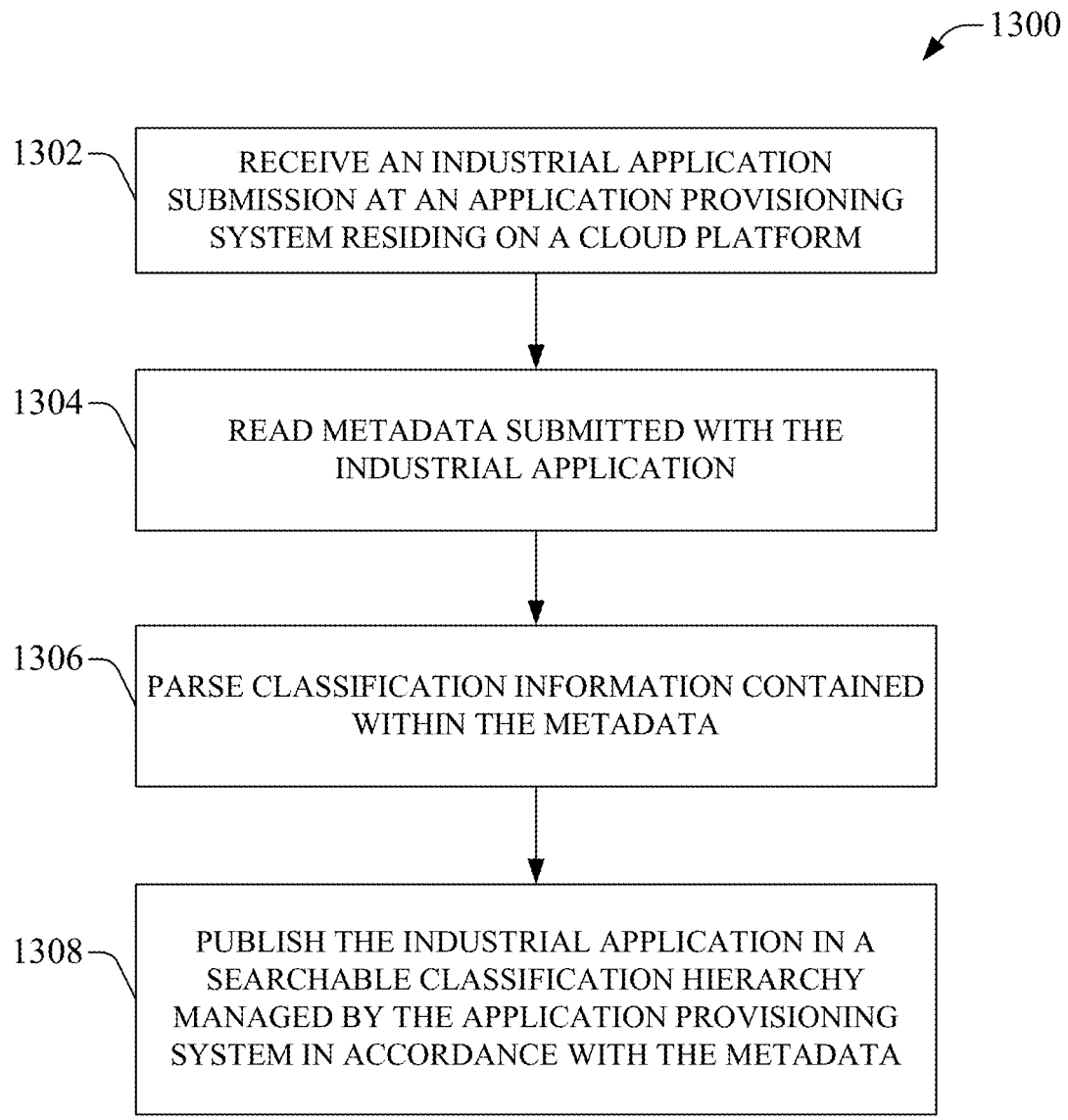
FIG. 13 is a flowchart of an example methodology for receiving and storing an industrial application submission at a cloud-based provisioning system.
Figure 14:
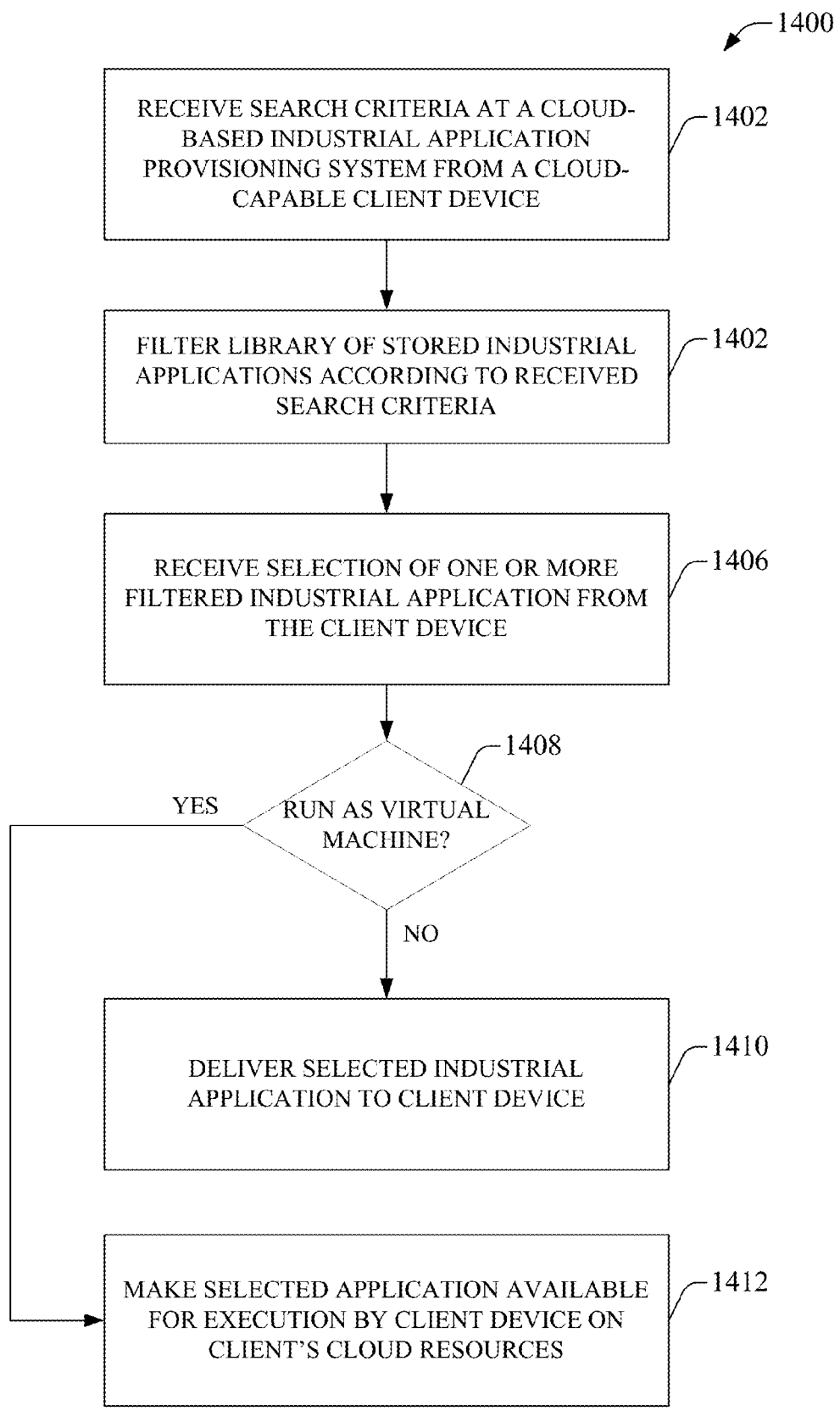
FIG. 14 is a flowchart of an example methodology for provisioning of industrial applications using a cloud platform.
Figure 15:
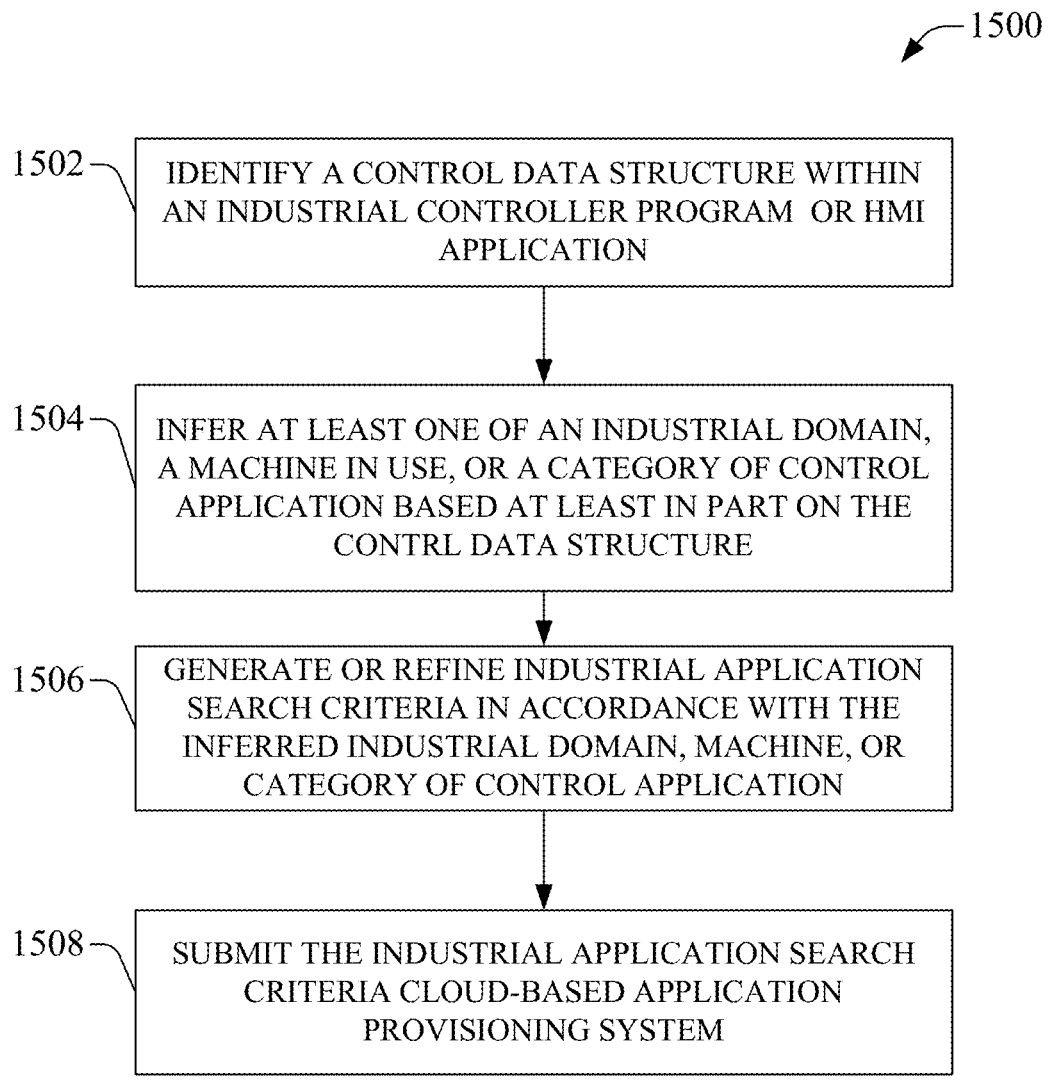
FIG. 15 is a flowchart of an example methodology for automatically generating suitable application search criteria based on identified control data structures in an existing industrial automation system.

FIGS. 13-15 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for receiving and storing an industrial application submission at a cloud-based provisioning system. Initially, at 1302, an industrial application submission is received by an application provisioning system residing on a cloud platform. The submitted industrial application can be, for example, industrial control programs or modular code segments for performing specific industrial control tasks, HMI applications or associated graphical elements, plant reporting applications, Enterprise Resource Planning (ERP) applications, manufacturing execution system (MES) software, firmware for industrial devices, software add-ons for implementing electronic signatures, or other such industrial applications. The submitted application may also be an industrial software widget or dashboard developed by an OEM designed to facilitate monitoring and/or controlling of proprietary equipment designed by the OEM. The industrial application may be submitted together with associated help files, usage tips, FAQs, instructional videos, or other such materials to guide users in connection with using the application.

At 1304, the cloud-based application provisioning system reads metadata submitted with the industrial application. This metadata can be used to categorize the application in the library for simplified searching and browsing, as described above in connection with FIGS. 4 and 5. At 1306, the application provisioning system parses classification information contained within the metadata. As discussed above, this classification information can include information regarding the industry or type of control system to which the application relates, particular industrial devices or equipment that the industrial application is intended to monitor or control, or other such classification categories. At 1308, the application provisioning system publishes the industrial application in a searchable library accessible through the cloud platform. The library catalogs the industrial application according to a searchable classification hierarchy, as described above in connection with FIGS. 4 and 5.

FIG. 14 illustrates an example methodology 1400 for provisioning of industrial applications using a cloud platform. Initially, at 1402, an industrial application provisioning system residing on a cloud platform receives search criteria from an authorized cloud-capable client device. In one or more embodiments, the client device can access the cloud platform via the Internet, and the provisioning system can allow access to its provisioning services after the client device has been authenticated. For example, the provisioning system may only allow client devices having an active subscription service to upload and retrieve industrial applications via the cloud platform. The search criteria can include, for example, an indication of a particular industry for which an application is desired, a type of control system in use, identification of devices or equipment that the application is intended to monitor or control, a type of automation application, or miscellaneous keywords that facilitate identification of a desired application.

At 1402, a library of stored industrial applications is filtered according to the received search criteria. The stored industrial applications can be cataloged in the library according to an industry-specific classification hierarchy, as described in previous examples, and the industrial application provisioning system can filter the stored applications to identify a subset of industrial applications matching the received search criteria. At 1406, a selection of one of the filtered industrial applications is received from the client device, where the selection indicates that the identified industrial application is to be made available for use by a user of the client device or an industrial enterprise with which the user is affiliated.

At 1408, it is determined whether the selected industrial application is to be run as a virtual machine on the cloud platform, or alternatively if the selected industrial application is to be downloaded to the client device for local execution. If the selected industrial application is to be run as a virtual machine, the method moves to step 1412, where the selected industrial application is made available for execution on a set of cloud resources provisioned to the user, as described above in connection with FIG. 8. In some embodiments, an industrial facility associated with the client device can subscribe to use a predetermined amount of cloud resources for the purpose of executing applications remotely, utilizing a portion of the cloud platform's storage or processing capacity, or other such cloud services. Alternatively, if it is determined that the selected industrial application is not to be run as a virtual machine at 1408, the method moves to step 1410, where the selected industrial application is delivered to the client device for local usage.

FIG. 15 illustrates an example methodology 1500 for automatically generating suitable application search criteria based on identified control data structures in an existing industrial automation system. Initially at 1502, a control data structure within an industrial controller or an HMI application of an existing automation system is identified. As discussed above in connection with FIG. 10, the control data structure can be, for example, a function block, a code segment, an equipment identifier, a graphical element, a data tag, an I/O module configuration, or other such data structure indicative of a particular industry, device in use, or control application type. The control data structure can be identified, for example, by a client interface of an industrial automation provisioning system that resides on a cloud platform and is accessible via a generic Internet layer. At 1504, based at least in part on the control data structure, an inference is made regarding at least one of an industrial domain of the automation system, a device or equipment in use at the industrial facility, or a category of a control application being implemented by the automation system.

At 1506, industrial application search criteria is generated or refined in accordance with the inferred industry, equipment, or type of control application determined at step 1504.

The search criteria can be designed to locate a subset of stored industrial applications that may be relevant to the automation system in use, based on the inferred information about the automation system determined at step 1504. At 1508, the search criteria generated at step 1506 is submitted to an industrial application provisioning system that maintains a library of published industrial applications on a cloud platform. The provisioning system can return a subset of the published industrial application applications determined to be potentially relevant to the user's automation system.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
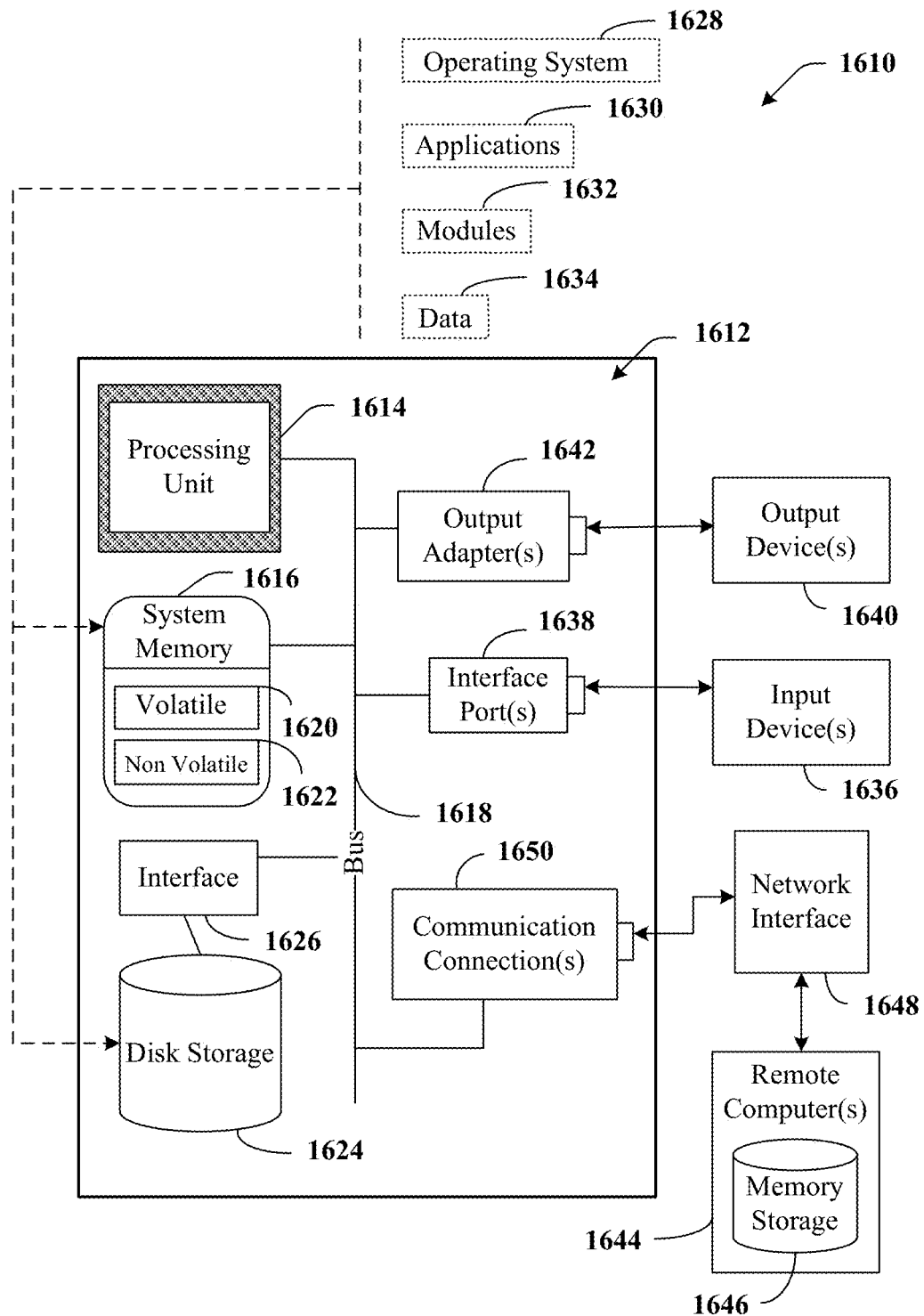
FIG. 16 is an example computing environment.
Figure 17:
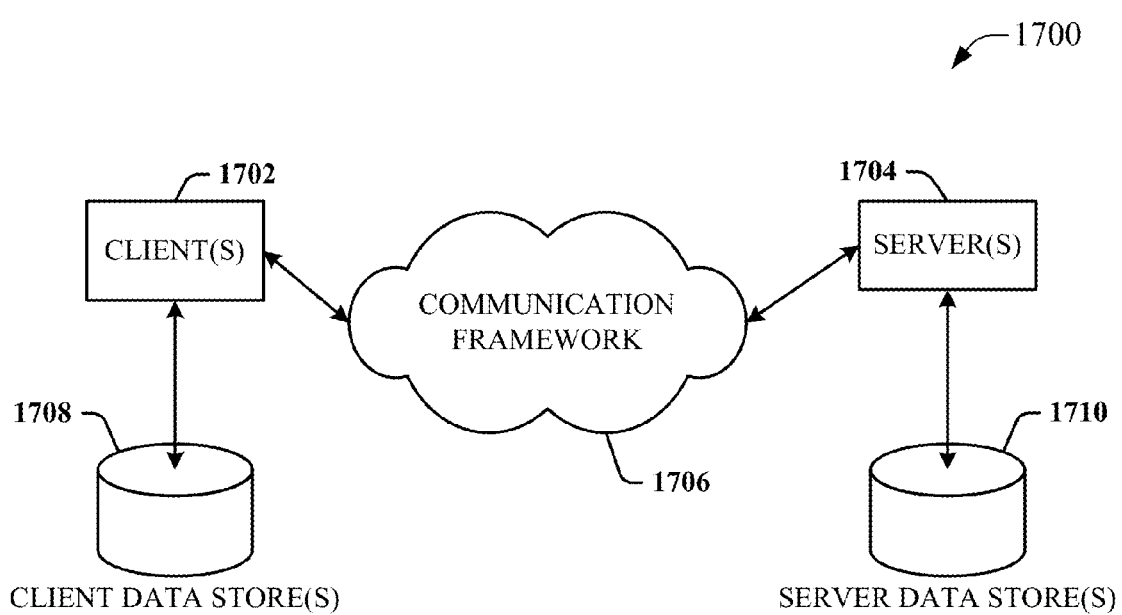
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented.

With reference to FIG. 16, an example environment 1610 for implementing various aspects of the aforementioned subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable PROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that one or more embodiments of the subject disclosure can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s)

1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

FIG. 17 is a schematic block diagram of a sample-computing environment 1700 with which the disclosed subject matter can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing one or more embodiments as described herein, for example. One possible communication between a client 1710 and a server 1730 can be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:
1. A system for provisioning industrial automation applications and related components, comprising:
 a memory that stores industrial applications in an application library residing on a cloud platform, wherein the industrial applications comprise at least one of industrial controller code or a human-machine interface graphic, the industrial applications are classified in the application library according to hierarchical categories of a storage schema, and the hierarchical categories comprise at least an industry type category specifying an industry and an industrial process type category specifying an industrial process type within the industry; and a processor that executes computer-executable components stored in the memory to implement the system, the computer-executable components comprising:

a publishing component that receives, from a first client device, an industrial application and associated metadata specifying at least an industry type and an industrial process type, and catalogs the industrial application in the application library in association with the industry type category and the industrial type category corresponding to the metadata;

a search component that receives browsing input from a second client device and selects a subset of the industrial applications based on the browsing input, wherein the browsing input progressively narrows the subset of the industrial applications based on a selected industry type and a selected industrial process type identified by the browsing input;

an interface component that displays the subset of the industrial applications on the second client device; and a retrieval component that provisions a selected industrial application of the subset of the industrial applications to the second client device.

2. The system of claim 1, wherein the metadata further specifies at least one of a control system type, a device, an equipment type, or a vendor to which the industrial application submission relates.

3. The system of claim 1, wherein the search component selects the subset of the industrial applications based on selection of a classification node of the storage schema.

4. The system of claim 1, wherein the publishing component creates a new classification node in the storage schema in response to determining that the metadata includes a new category not existent within the storage schema.

5. The system of claim 1, wherein the publishing component receives a submission of at least one of a software update for an industrial application or a modular component of an industrial application and catalogs the submission in the application library.

6. The system of claim 1, further comprising:
a subscription component that receives and manages a subscription request from the second client device; and
a notification component that delivers a notification to the second client device in response to a determination that a new or updated industrial application corresponding to the subscription request has been published to the application library.

7. The system of claim 1, wherein the retrieval component makes the selected industrial application available for execution by the second client device using a set of cloud resources provisioned to an industrial enterprise associated with the second client device.

8. A method for provisioning industrial applications, comprising:

receiving, by a system comprising a processor, an industrial application and associated metadata from a first client device, wherein the industrial application comprises at least one of industrial controller code or an industrial visualization application, and the metadata specifies at least an industry type and a type of industrial process to which the industrial application pertains;

indexing, by the system in response to the receiving, the industrial application in an application library based on the metadata, wherein the application library resides on a cloud platform and classifies the industrial application in association with hierarchical categories of a storage schema, the hierarchical categories corresponding to at least the industry type and the type of industrial process specified by the metadata;

receiving, by the system, browsing data from a second client device;

selecting, by the system in response to the receiving the browsing data, a subset of industrial applications stored in the application library based on the browsing data, wherein the browsing data progressively narrows the subset of the industrial applications based on a selected industry type and a selected type of industrial process identified by the browsing data;

rendering, by the system, identification information for the subset of industrial applications; and delivering, by the system, a selected industrial application of the subset of industrial applications to a memory location associated with the second client device.

9. The method of claim 8, further comprising granting the second client device permission to execute the selected industrial application using a set of cloud resources associated with an industrial enterprise.

10. The method of claim 8, further comprising:
receiving, by the system, selection of a category of the hierarchical categories; and
selecting, by the system, the subset of industrial applications based on selection of the category.

11. The method of claim 8, further comprising creating, by the system, a new category of the hierarchical categories in response to determining that the metadata includes the new category and that the new category is not existent within the storage schema.

12. The method of claim 8, further comprising:
receiving, by the system, a subscription request from the second client device; and
delivering, by the system, a notification to the second client device in response to determining that a new or updated industrial application corresponding to the subscription request has been published to the application library.

13. A non-transitory computer-readable medium having stored thereon executable instructions that, in response to execution, cause a computing system to perform operations, the operations comprising:

receiving an industrial application and associated metadata from a first client device, the industrial application comprising at least one of programming code for an industrial controller or a human-machine interface graphic, and the metadata specifying at least an industry type and a type of industrial process to which the industrial application pertains;

indexing the industrial application in an application library in accordance with the metadata, the application library residing on a cloud platform and classifying the industrial application according to hierarchical categories of a storage schema comprising at least the industry type and the type of industrial process specified by the metadata;

receiving browsing input from a second client device;

identifying a subset of industrial applications stored in the application library based on the browsing input, wherein the browsing input progressively narrows the subset of the industrial applications based on a selected industry type and a selected type of industrial process identified by the browsing input;

displaying identification information for the subset of industrial applications; and provisioning a selected industrial application of the subset of industrial applications to a memory location associated with the second client device.

14. The non-transitory computer-readable medium of claim 13, wherein the provisioning comprises allowing the second client device to execute the selected industrial application using a set of cloud resources assigned to an industrial enterprise.

15. The system of claim 1, wherein the type of industrial process comprises at least one of batch processing, material handling, motion control, vision, conveyor control, painting, welding, or die casting.

16. The method of claim 8, wherein the indexing comprises classifying the industrial application as at least one of a batch processing application, a material handling application, a motion control application, a vision application, a conveyor control application, a painting application, a welding application, or a die casting application.

17. The non-transitory computer-readable medium of claim 13, wherein the operations further comprise:

receiving selection of a category of the hierarchical categories; and selecting the subset of industrial applications based on selection of the category.

18. The non-transitory computer-readable medium of claim 13, wherein the operations further comprise creating a new category of the hierarchical categories in response to determining that the metadata includes the new category and that the new category is not defined within the storage schema.

19. The non-transitory computer-readable medium of claim 13, wherein the operations further comprise:

receiving a subscription request from the second client device; and delivering a notification to the second client device in response to determining that a new or updated industrial application corresponding to the subscription request has been published to the application library.

20. The method of claim 8, further comprising:

receiving a submission of at least one of a software update for an industrial application or a modular component of an industrial application; and cataloging the submission in the application library.

21. The non-transitory computer-readable medium of claim 13, wherein the operations further comprise:

receiving a submission of at least one of a software update for an industrial application or a modular component of an industrial application; and cataloging the submission in the application library.

* * * * *